US012179499B2

(12) United States Patent
Banno et al.

(10) Patent No.: US 12,179,499 B2
(45) Date of Patent: Dec. 31, 2024

(54) PRINTER, CONTROL METHOD OF THE PRINTER, AND THERMOSENSITIVE MEDIUM

(71) Applicant: BROTHER KOGYO KABUSHIKI KAISHA, Nagoya (JP)

(72) Inventors: Takaaki Banno, Nagoya (JP); Chisato Yoshimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 200 days.

(21) Appl. No.: 17/876,463

(22) Filed: Jul. 28, 2022

(65) Prior Publication Data

US 2023/0032533 A1 Feb. 2, 2023

(30) Foreign Application Priority Data

Jul. 30, 2021 (JP) ................................ 2021-126248

(51) Int. Cl.
*B41J 2/355* (2006.01)
*B41J 3/407* (2006.01)

(52) U.S. Cl.
CPC ............ *B41J 2/355* (2013.01); *B41J 3/4075* (2013.01)

(58) Field of Classification Search
CPC ................................ B41J 2/355; B41J 3/4075
See application file for complete search history.

(56) References Cited

U.S. PATENT DOCUMENTS

2015/0273865 A1* 10/2015 Kubota .................. B41J 3/4075 347/110

FOREIGN PATENT DOCUMENTS

JP 2015-182376 A 10/2015

* cited by examiner

*Primary Examiner* — Justin Seo
(74) *Attorney, Agent, or Firm* — KENEALY VAIDYA LLP

(57) ABSTRACT

A printer includes a thermal head and a controller. The thermal head performs thermal printing on a thermosensitive medium having a background area with a background color being an unprinted color and a pre-print area, which is an area colored in advance, with a pre-print color different from the background color. The controller performs printing processing of causing the thermal head to execute the thermal printing in which a print area, which includes at least a part of the pre-print area, of the thermosensitive medium is printed with a print color different from both the background color and the pre-print color, and an overlapping area of the pre-print area, which overlaps with the print area, is printed with a specific color different from the pre-print color.

38 Claims, 24 Drawing Sheets

FIG. 9

| COLOR | REFLECTION DENSITY | MUNSELL BRIGHTNESS |
|---|---|---|
| PRINT COLOR | 1 OR MORE | 4 OR MORE |
| BACKGROUND COLOR | 0.25 OR LESS | 7 OR MORE |

PRINTER, CONTROL METHOD OF THE PRINTER, AND THERMOSENSITIVE MEDIUM

REFERENCE, TO RELATED APPLICATIONS

This application claims priority from Japanese Patent Application No. 2021-126248 filed on Jul. 30, 2021. The entire content of the priority application is incorporated herein by reference.

BACKGROUND ART

It is known for a printing method to use a special print tape. The special print tape is formed with a special print area. The special print area has a background color. The background color is the same as a print color by a printer. A segment is printed in advance in the special print area. The segment has a pre-printed color. The pre-printed color is different from the print color. A printer creates a print result by performing printing with the print color so as to selectively fill the segment of the special punt tape. A user can visually recognize the pre-printed color of the segment not filled with the print color in the print result. Since the pre-printed color is also used, in addition to the background color and the print color, a print result with high information identification is provided to the user.

In the above printing method, it is necessary to perform printing in advance in the special print area with the print color as the background color before performing printing on the segment by the printer, in order to make the background color the same as the print color. Therefore, the cost of creating a print result may increase.

DESCRIPTION

An object of the present disclosure is to provide a printer, a control method of the printer, and a thermosensitive medium capable of creating a print result with high information identification at low cost.

A first aspect of the present disclosure is a printer including: a thermal head configured to perform thermal printing on a thermosensitive medium having a background area with a background color being an unprinted color and a pre-print area, which is an area colored in advance, with a pre-print color different from the background color; and a controller configured to perform printing processing of causing the thermal head to execute the thermal printing in which a print area, which includes at least a part of the pre-print area, of the thermosensitive medium is printed with a print color different from both the background color and the pre-print color, and an overlapping area of the pre-print area, which overlaps with the print area, is printed with a specific color different from the pre-print color.

According to the first aspect, printing for coloring is not performed on the background area of the thermosensitive medium. That is, the printer can use a low-cost thermosensitive medium. The printer can create a print result by performing thermal printing on a thermosensitive medium by printing processing. The print result shows information by at least three colors of the background color, the pre-print color, and the specific color. For this reason, the printer can create a print result with higher information identification than a case where a print result shows the information with two colors, for example. Further, since the print area includes at least a part of the pre-print area, as the overlapping area, the print result can show information different from each other by a difference in area or shape of the overlapping area. For this reason, the printer can create a print result with higher information identification than a case where a print result shows information by a difference in color of the background color, the pre-print color and the print color. Therefore, the printer can create a print result with high information identification at low cost.

A second aspect of the present disclosure is a control method of a printer configured to perform thermal printing on a thermosensitive medium having a background area with a background color being an unprinted color and a pre-print area, which is an area colored in advance, with a pre-print color different from the background color, the control method including: printing processing of performing the thermal printing in which a print area, which includes at least a part of the pre-print area, of the thermosensitive medium is printed with a print color different from both the background color and the pre-print color, and an overlapping area of the pre-print area, which overlaps with the print area, is printed with a specific color different from the pre-print color.

The second aspect can achieve the similar effects to the first aspect.

A third aspect of the present disclosure is a thermosensitive medium having: a background area with a background color being an unprinted color; and a pre-print area, which is an area colored in advance, with a pre-print color different from the background color, in which in a case where thermal printing is performed for a print area, which includes at least a part of the pre-print area, of the thermosensitive medium, the pre-print area is thermally printed with a print color different from both the background color and the pre-print color, and an overlapping area of the pre-print area, which overlaps with the print area, is printed with a specific color different from the pre-print color.

The third aspect can achieve the similar effects to the first aspect.

FIG. 9 is a table showing a relationship between the reflectance and the Munsell brightness of each of a print color and a background color.

Hereinafter, a first embodiment of the present disclosure will be described with reference to the drawings. Note that, the drawings are used so as to describe technical features that can be adopted by the present disclosure. The configuration of the apparatus, the flowcharts of various processing and the like, which are shown, are not limited to the forms thereof and are just explanatory examples. When referring to colors, the drawings show the difference in color by plane, black paint, dots, and directions of lines.

Figure 1:
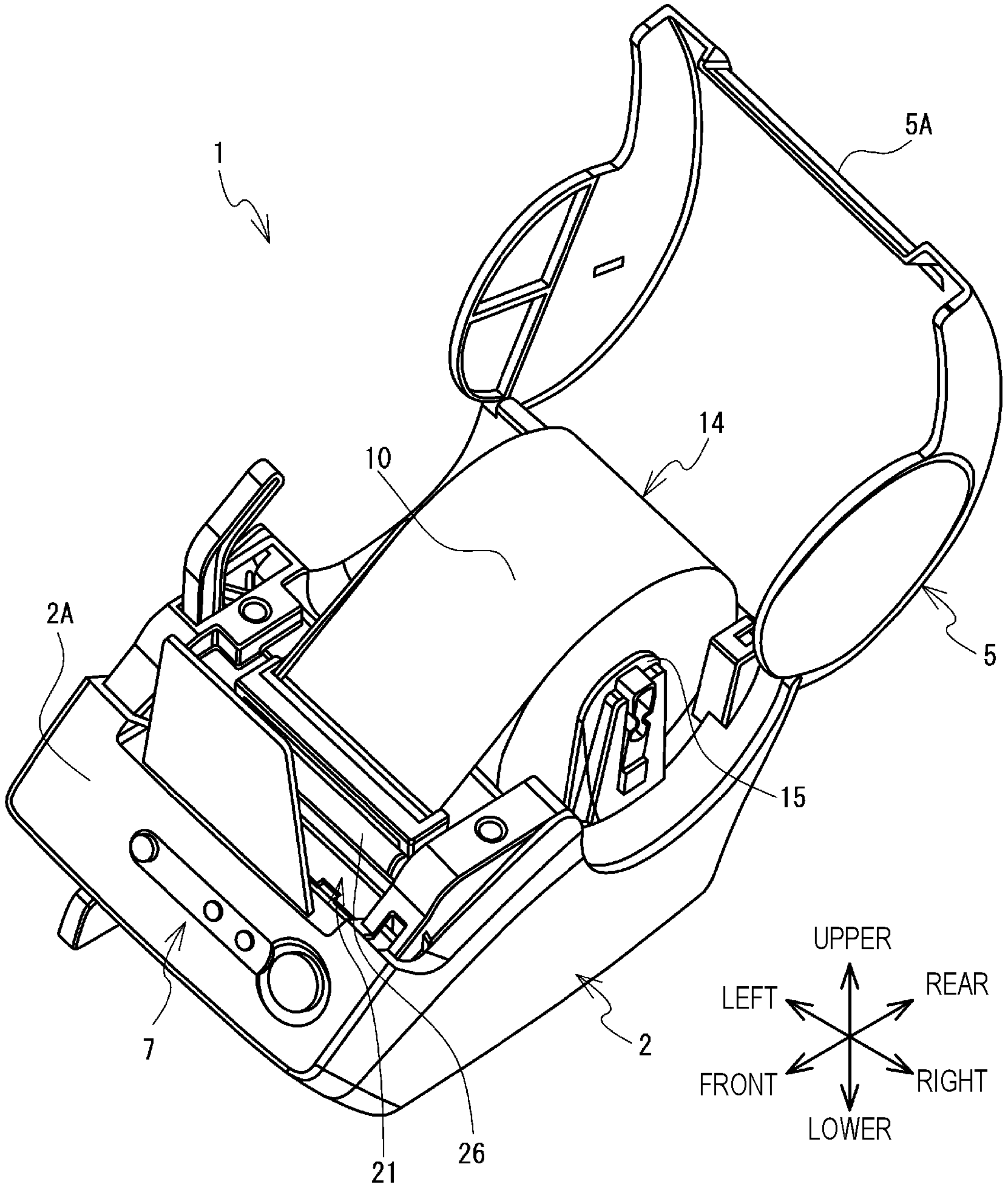
FIG. 1 is a perspective view of a printer 1 in a state where a cover 5 is opened.

A mechanical configuration of a printer 1 is described with reference to FIGS. 1 to 3. In the following description, the right upper, the left lower, the right lower, the left upper, the upper, and the lower of FIG. 1 are referred to as the rear, the front, the right, the left, the upper and the lower of the printer 1, respectively. The printer 1 is a thermal printer, and is configured to thermally print texts or images such as characters, numbers, symbols, and figures on a thermosensitive tape 10.

As shown in FIG. 1, the printer 1 includes a housing 2 and a cover 5. The cover 5 is provided above the housing 2 and can be opened and closed with respect to the housing 2. An operation unit 7 is provided on a front surface 2A of the housing 2. The operation unit 7 includes a power supply button and the like, and can input a variety of information to the printer 1.

Figure 2:
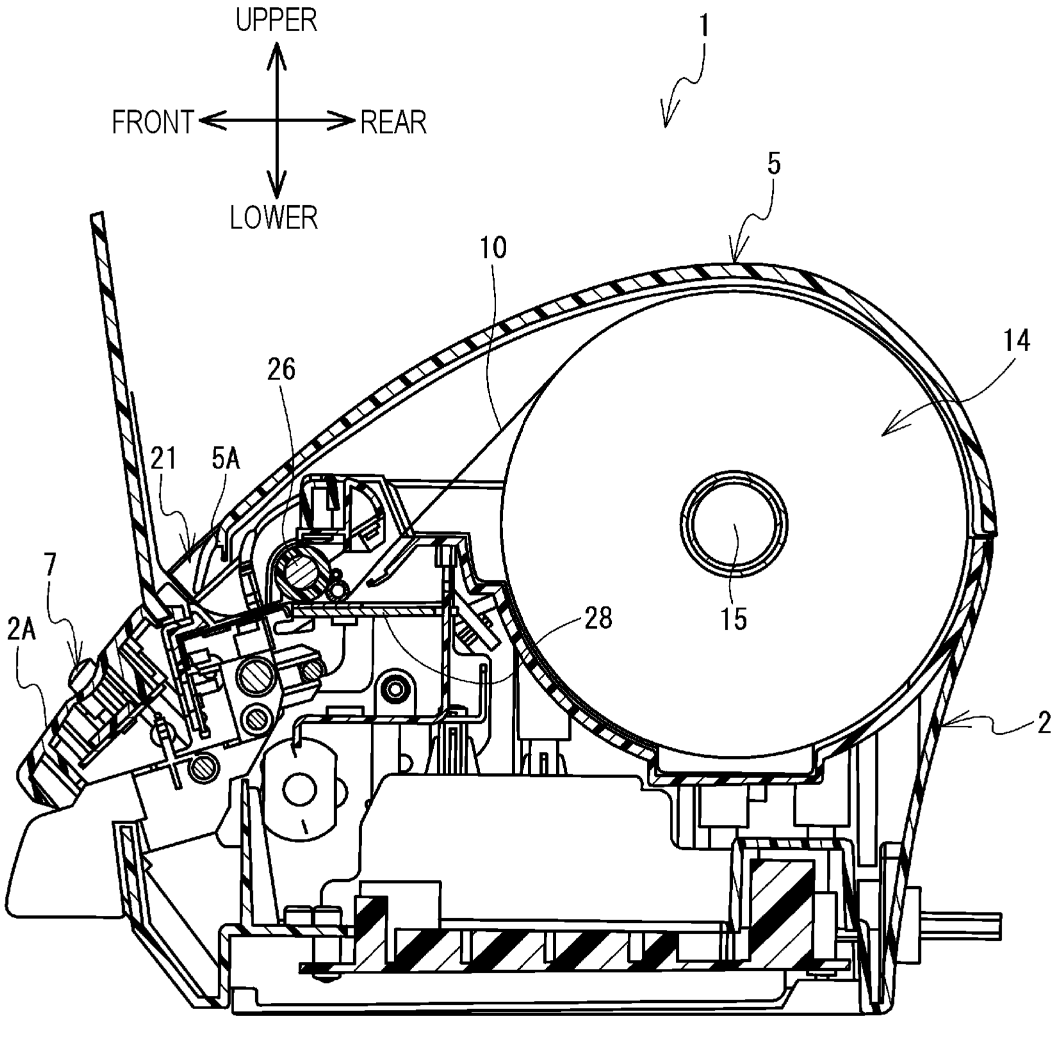
FIG. 2 is a cross-sectional view of the printer 1 in a state where the cover 5 is closed.

As shown in FIG. 2, a tape roll 14 is detachably accommodated at a rear part inside the housing 2. The tape roll 14 is configured by winding the thermosensitive tape 10 around a core 15, and can rotate about the core 15. In a state where the cover 5 is closed, a discharge slot 21 is formed between a front end 5A of the cover 5 and the front surface 2A of the housing 2. A thermal head 28 is provided behind the discharge slat 21. As shown in FIG. 3, a plurality of heat generators 281 are provided on an upper surface of the thermal head 28. The plurality of heat generators 281 are arranged in a right and left direction.

As shown in FIG. 2, a platen roller 26 is provided above the thermal head 28. The platen roller 26 faces the thermal head 28 and can move in an upper and lower direction according to the opening and closing of the cover 5. The facing direction (upper and lower direction) of the thermal head 28 and the platen roller 26 is orthogonal to the arrangement direction (right and left direction) of the plurality of heat generators 281.

Figure 3:
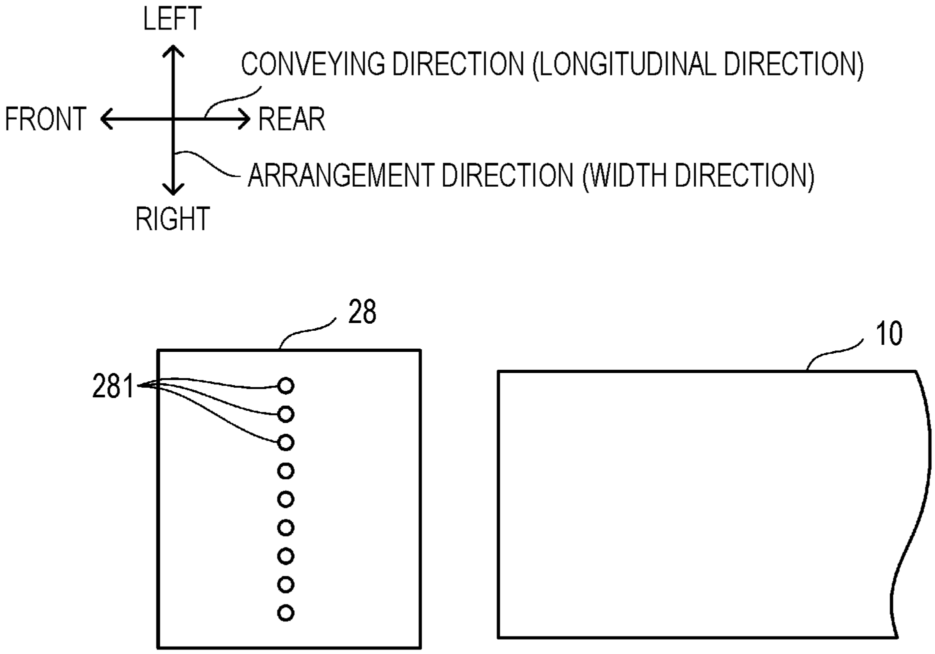
FIG. 3 is a plane view of a thermal head 28.

In the state where the cover 5 is closed, the platen roller 26 is configured to sandwich the thermosensitive tape 10 with the thermal head 28, and to press the thermosensitive tape 10 against the plurality of heat generators 281 (refer to FIG. 3). In a state where the cover 5 is opened, the platen roller 26 is separated upward from the thermal head 28. The platen roller 26 is configured to rotate by drive of a conveying motor 29 (refer to FIG. 4) in the state where the cover 5 is closed, thereby conveying the thermosensitive tape 10 from the tape roll 14 toward the discharge slot 21 along a conveying direction.

As shown in FIG. 3, the conveying direction is a direction in which the thermosensitive tape 10 extends, and is orthogonal to the arrangement direction (right and left direction) of the plurality of heat generators 281. The thermal head 28 is configured to perform thermal printing on the thermal tape 10 conveyed by the platen roller 26 (refer to FIG. 2) by selectively causing the plurality of heat generators 281 to generate heat.

Figure 4:
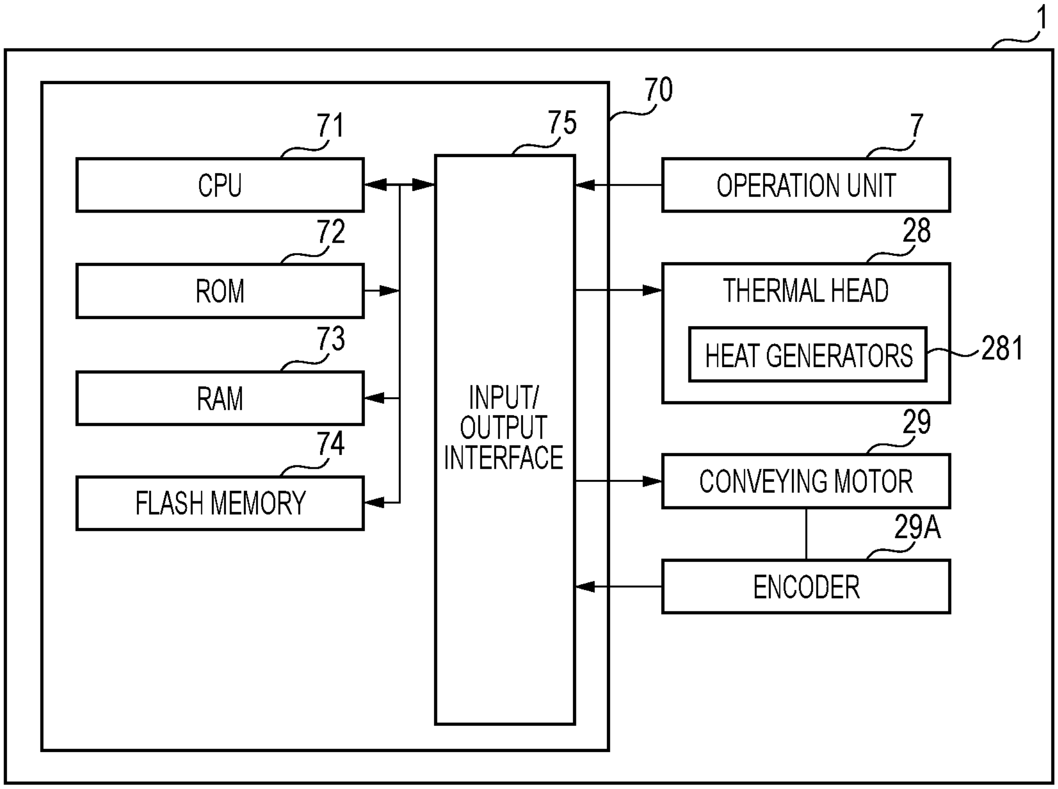
FIG. 4 is a block diagram showing an electrical configuration of the printer 1.

An electrical configuration of the printer 1 is described with reference to FIG. 4. The printer 1 includes a control substrate 70. The control substrate 70 is provided with a CPU 71, a ROM 72, a RAM 73, a flash memory 74, and an input/output interface 75 connected to each other. The CPU 71 is configured to control the printer 1. The ROM 72 is configured to store various parameters and the like necessary for the CPU 71 to execute various programs. For example, the ROM 72 stores a plurality of types of fonts of texts. The fonts include a standard type and a bold type as a text thickness. The standard type is a font with a standard text thickness. The bold type is a font where a text thickness is thicker than the standard type. The font has multiple font sizes. The font size defines a size of a text area DT (refer to FIG. 6) described later. The RAM 73 is configured to temporarily store various information such as execution results and the like by the CPU 71.

The flash memory 74 is configured to store various programs that are executed by the CPU 71, print data that is generated by print data generation processing (refer to FIG. 10) described later, and the like. The various programs include a program for main processing described later. The print data includes at least one of text data and image data. The text data indicates a text area DT described later, and a text arranged in the text area DT. The image data indicates an image. In the below, when a text and an image are not distinguished, the text and the image are collectively referred to as “print element”. The operation unit 7, the thermal head 28, the conveying motor 29, and an encoder 29A are connected to the input/output interface 75.

The encoder 29A is configured to output a signal corresponding to an amount of rotation of the conveying motor 29 to the CPU 71. The CPU 71 can specify an amount of rotation of the conveying motor 29, based on a signal output from the encoder 29A. Further, the CPU 71 can specify a conveying amount of the thermosensitive tape 10 that is conveyed by the platen roller 26, based on the specified amount of rotation and a diameter of the platen roller 26.

Figure 5:
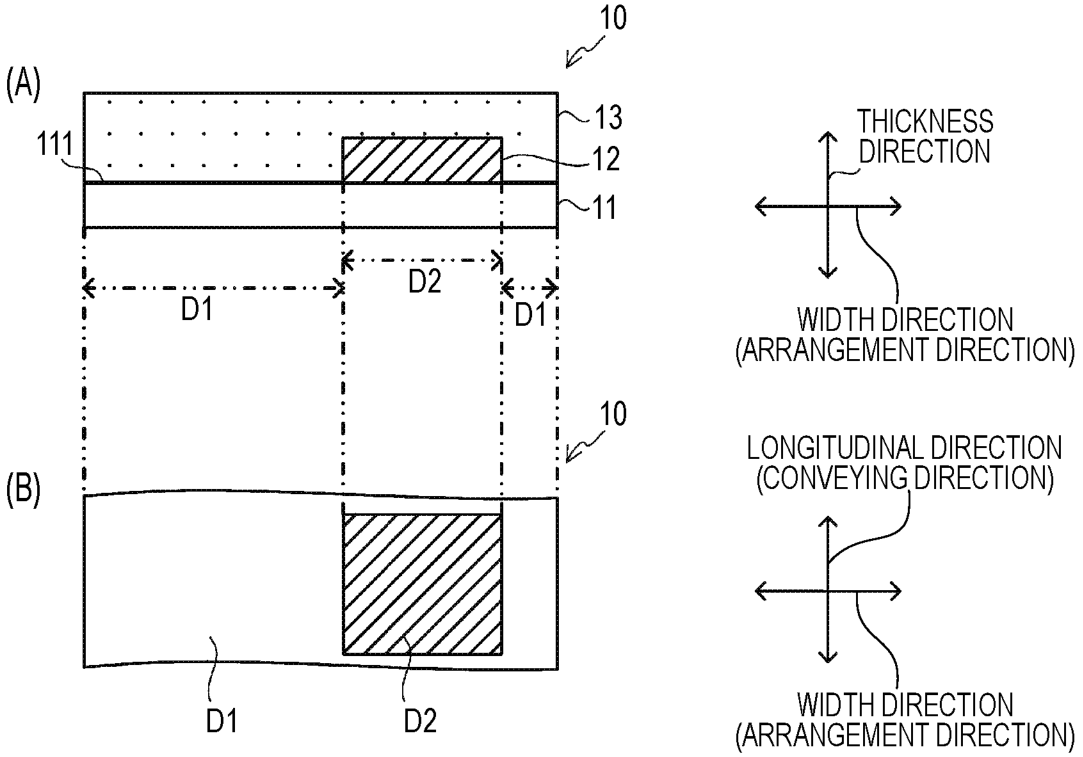
FIG. 5 is schematic diagrams showing a thermosensitive tape 10.

An example of the thermosensitive tape 10 is described with reference to FIG. 5. The thermosensitive tape 10 has a long shape and is configured by laminating a plurality of layers. In the below a direction in which the plurality of layers are laminated is referred to as “thickness direction”, a short direction of the thermosensitive tape 10 is referred to as “width direction”, and a longitudinal direction of the thermosensitive tape 10 is simply referred to as “longitudinal direction”. In the printer 1, the width direction coincides with the arrangement direction, and the longitudinal direction coincides with the conveying direction. View (A) illustrated in FIG. 5 shows a cross-sectional view of the thermosensitive tape 10, as seen from the longitudinal direction. View (B) illustrated in FIG. 5 shows a plane view of the thermosensitive tape 10, as seen from a printing surface.

As shown in the view (A) of FIG. 5, the thermosensitive tape 10 includes a base material 11, a pre-print layer 12, and a thermosensitive layer 13. The base material 11, the pre-print layer 12, and the thermosensitive layer 13 are laminated in this order in the thickness direction. Note that, an overcoat layer for protecting the thermosensitive layer 13 may be further laminated on the thermosensitive layer 13. The base material 11 has a long shape and extends in the longitudinal direction. The pre-print layer 12 is an ink layer and is provided in advance on a part of a surface 111 of the base material 11. The thermosensitive layer 13 is laminated on the surface 111 with the pre-print layer 12 interposed therebetween in the thickness direction. The thermosensitive layer 13 is heated by heat generated by the heat generators 281, and thus, is color-developed into a print color described later. Therefore, in the thermosensitive tape 10, the thermosensitive layer 13-side with respect to the base material 11 in the thickness direction is a printing surface.

In the below, seeing the thermosensitive tape 10 from the printing surface-side is referred to as "a plane view". An area that extends on the thermosensitive tape 10 in a plane view and is an area of the thermosensitive tape 10 having a background color described later is referred to as a "background area". The background color is not limited to a specific color, but is an unprinted color.

An area that extends on the thermosensitive tape 10 in a plane view and has a pre-print color is referred to as a "pre-print area". The pre-print color is not limited to a specific color, but is a color different from the background color. The pre-print area is an area provided with the pre-print layer 12 in a plane view, i.e., an area colored in advance. Note that, when the base material 11 or the thermosensitive layer 13 is formed, a process of coloring the base material 11 or the thermosensitive layer 13 is not included in "printing".

As shown in FIG. 5, the thermosensitive tape 10 has a background area D1 and a pre-print area D2. An outer shape of the pre-print area D2 is rectangular in a plane view. The pre-print area D2 is located at a position apart from both ends of the thermosensitive tape 10 in the width direction, and is also located at a position apart from both ends of the thermosensitive tape 10 in the longitudinal direction. In other words, the background area D1 is provided on both sides of the pre-print area D2 in the width direction and on both sides of the pre-print area D2 in the longitudinal direction of the thermosensitive tape 10. An area of the pre-print area D2 is equal to or larger than 25 $mm^2$, and is smaller than an entire area of the printing surface of the thermosensitive tape 10.

The background area D1 has a background color. As shown in the view (A) of FIG. 5, in the first embodiment, a color of the surface 111 of the base material 11 is opaque white (plane in FIG. 5), and a color (dots in FIG. 5) of the thermosensitive layer 13 is light-transmissive. Therefore, as shown in the view (B) of FIG. 5, the background color, i.e., the color of the background area D1 is opaque white (plane in FIG. 5) as the color of the surface 111 of the base material 11, or a color close to opaque white as a mixed color of the color of the surface 111 and the color of the thermosensitive layer 13. Specifically, the background color satisfies the brightness≥7 in the Munsell color system. Note that, the color of the base material 11 is not limited to white and is not limited to opaque, and may be light-transmissive. The base material 11 may be, for example, a transparent film.

The pre-print area D2 has a pre-print color. As shown in the view (A) of FIG. 5, in the first embodiment, a color of the pre-print layer 12 is opaque blue (diagonal lines in FIG. 5), and a color (dots in FIG. 5) of the thermosensitive layer 13 is light-transmissive. Therefore, as shown in the view (B) of FIG. 5, the pre-print color, i.e., the color of the pre-print area D2 is opaque blue (diagonal lines in FIG. 5) as the color of the pre-print layer 12. Specifically, the pre-print color is a color in the Munsell color system that does not satisfy both conditions of brightness≤2 and chroma<1 and does not satisfy both conditions of brightness≥8 and chroma<1. Note that, the color of the pre-print layer 12 may be light-transmissive and may not be blue. The color of the thermosensitive layer 13 may be translucent or may not be colorless.

Figure 6:
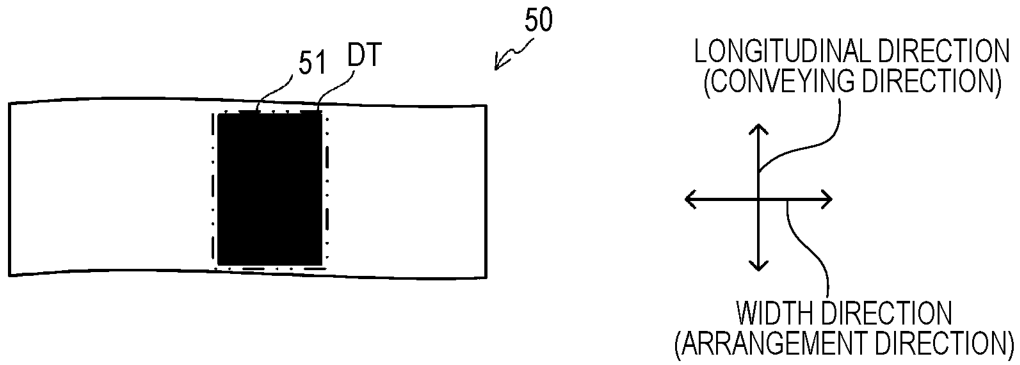
FIG. 6 is a conceptual diagram showing print data 50.
Figure 7:
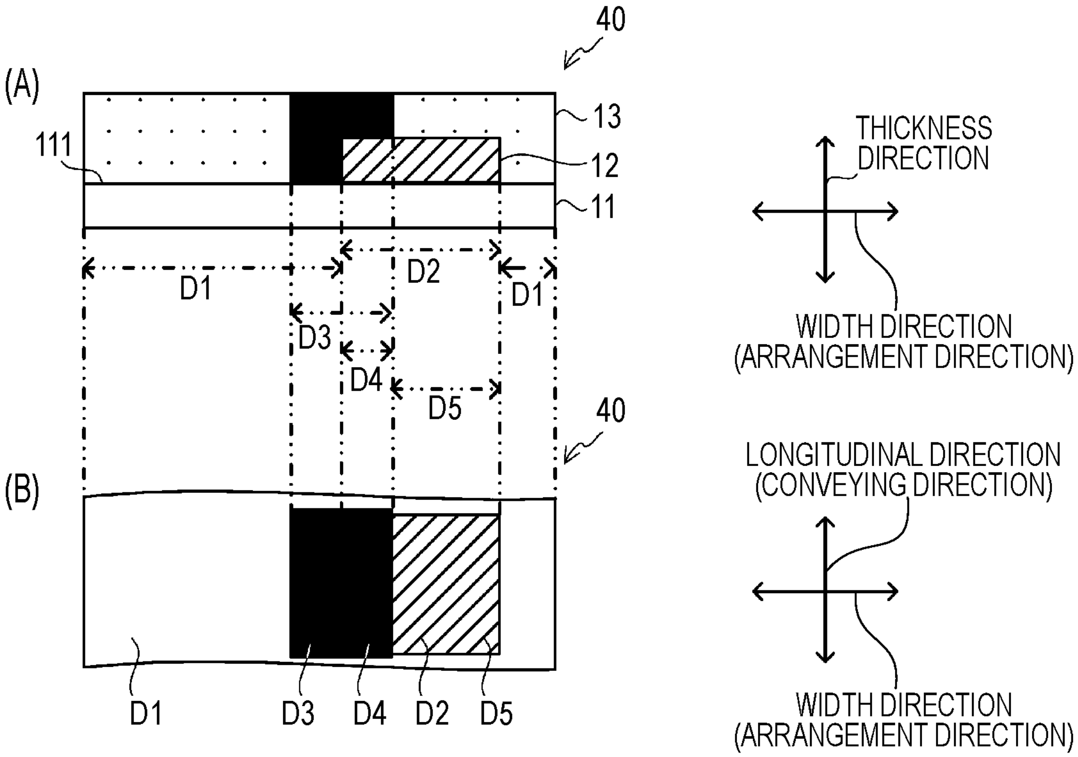
FIG. 7 is schematic diagrams showing a print result 40.

An example of print data 50 is described with reference to FIG. 6. FIG. 6 shows an image of the print data 50, and a print element 51 corresponding to a print area D3 shown in FIG. 7 is shown in black paint. In the print data 50, the print element 51 is "■" (a solid black square) as a kind of a text, and is arranged in a text area DT. The text area DT has a rectangular shape. The text area DT is configured by a font size where a length of one side of the text area DT is 1.41 mm or longer. The print element 51 is configured by a bold type. Note that, the print element 51 may also be an image. The printer 1 creates a print result 40 shown in FIG. 7 by performing thermal printing on the thermosensitive tape 10 shown in FIG. 5, based on the print data 50 shown in FIG. 6.

An example of the print result 40 is described with reference to FIG. 7. View (A) illustrated in FIG. 7 shows a cross-sectional view of the print result 40, as seen from the longitudinal direction. View (B) illustrated in FIG. 7 shows a plane view of the print result 40, as seen from the printing surface. The print result 40 is the thermosensitive tape 10 (refer to FIG. 5) on which thermal printing has been performed. Therefore, a structure of the print result 40 is different from a structure of the thermosensitive tape 10 only in the presence or absence of color development in the print area D3 of the thermosensitive layer 13.

In the below, an area that extends on the thermosensitive tape 10 in a plane view and includes at least a part of the pre-print area D2 is referred to as a "print area". The print area is an area color-developed into a print color by thermal printing. The print color is not limited to a specific color, but is a color different from both the background color and the pre-print color. An area of the pre-print area that overlaps with the print area is referred to as "overlapping area". The overlapping area is an area that has a specific color by thermal printing. The specific color is not limited to a specific color, but is a color different from the pre-print color.

As shown in FIG. 7, the print area D3 includes a part of the pre-print area D2 in a plane view. When thermal printing is performed by the printer 1, the thermal layer 13 is color-developed into a print color in the print area D3. The overlapping area D4 overlaps with the print area D3 of the pre-print area D2 in a plane view. An exposed area D5 is an area other than the overlapping area D4 of the pre-print area D2 in a plane view, i.e., an area that does not overlap with the print area D3. An area of the exposed area D5 is equal to a difference between an area of the pre-print area D2 and an area of the overlapping area D4, and is larger than an area of the print area D3.

The print area D3 has a print color. In the first embodiment, the print color is opaque black (black paint in FIG. 6). Specifically, the print color satisfies both conditions of brightness≤4 and chroma≤3 in the Munsell color system.

The overlapping area D4 has a specific color. As shown in the view (A) of FIG. 7, in the first embodiment, the print color is opaque black (black paint in FIG. 6). Therefore, as shown in the view (B) of FIG. 7, the specific color, i.e., the color of the overlapping area D4 is opaque black (black paint in FIG. 6) that is the same as the prim color. In this case, the pre-print area D2 is covered and hidden with the specific color (black paint in FIG. 6) in the overlapping area D4. For this reason, a user can visually recognize the pre-print color (diagonal lines in FIG. 5) only in the exposed area D5 of the pre-print area D2.

Figure 8:
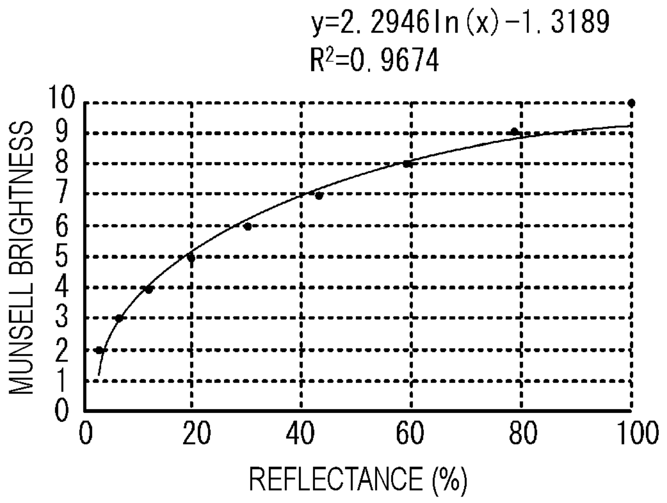
FIG. 8 is a graph showing a relationship between the reflectance and the brightness in the Munsell color system.

With reference to FIGS. 8 and 9, a relationship between the brightness of the Munsell color system and the reflectance and a relationship between the brightness of the Munsell color system and the reflection density are described. In the graph of FIG. 8, the reflectance (%) is shown on the horizontal axis, and the brightness of the Munsell color system is shown on the vertical axis. Specifically, in the graph of FIG. 8, the reflectance corresponding to each brightness in the Munsell color system is plotted, and the relationship between the brightness of the Munsell color system and the reflectance is shown by an approximate curve. The approximate curve is shown by $y=2.2946 \ln(x)-1.3189$. The determination coefficient($R^2$) is 0.9674. As the brightness of the Munsell color system increases, the reflectance also increases, Note that, the greater the brightness of the Munsell color system is, the greater a rate of increase in reflectance is.

The reflection density is defined by a following equation.

$$\text{reflection density}=\log_{10}(\text{reflectance})$$

As shown in FIG. 9, in the case of the brightness≥4 in the Munsell color system, the reflection density is 1 or more. In the case of the brightness≥7 in the Munsell color system, the reflection density is 0.25 or less. In the first embodiment, since the print color satisfies the brightness≤4 in the Munsell color system, the reflection density of the print color is 1 or more. Further, since the background color satisfies the brightness≥7 in the Munsell color system, the reflection density of the background color is 0.25 or less. Therefore, the reflection density of the print color is larger than the reflection density of the background color. Note that, the reflection density of the print color may also be equal to or less than the reflection density of the background color.

The main processing is described with reference to FIG. 10, When the power is input to the printer 1, the CPU 71 reads out a program from the flash memory 74 and starts main processing. In the below, a case where the thermosensitive tape 10 shown in FIG. 5 is used to create the print result 40 shown in FIG. 7 is given as an appropriate example.

When the main processing is started, the CPU 71 performs print data generating processing (S1). In the print data generating processing, the CPU 71 generates print data, in response to a user's operation on the operation unit 7 (refer to FIGS. 1 and 4). When creating the print result 40 shown in FIG. 7, the CPU 71 generates the print data 50 shown in FIG. 6. The user operates the operation unit 7 and inputs a printing instruction to the printer 1. The CPU 71 acquires the input printing instruction (S2).

The CPU 71 performs printing processing, based on the print data generated in the processing of S1 (S3). In the printing processing, the CPU 71 drives the conveying motor 29 shown in FIG. 4 to rotate the platen roller 26 shown in FIG. 2. As shown in FIG. 2, the platen roller 26 conveys the thermosensitive tape 10 from the tape roll 14 toward the discharge slot 21. As shown in FIG. 3, the CPU 71 controls the thermal head 28 to selectively cause the plurality of heat generators 281 to generate heat. The thermal head 28 performs thermal printing on the conveyed thermosensitive tape 10. In this way, the CPU 71 causes the thermal head 28 to execute thermal printing, based on at least one of the image data and the text data in the print data generated by the print data generating processing.

When creating the print result 40 shown in FIG. 7, the CPU 71 performs thermal printing in the print area D3 shown in FIG. 7 on the thermosensitive tape 10 shown in FIG. 5, based on the print data 50 shown in FIG. 6. Thereby, the print result 40 is created. The CPU 71 ends the main processing.

As described above, in the first embodiment, printing for coloring is not performed on the background area D1 of the thermosensitive tape 10. That is, the printer 1 can use the low-cost thermosensitive tape 10. The printer 1 can create the print result 40 by performing thermal printing on the thermosensitive tape 10 by the printing processing. The print result 40 shows information by three colors of the background color, the pre-print color and the print color. For this reason, the printer 1 can create the print result 40 with higher information identification than a case where the print result 40 shows information with two colors of the background color and the print color, for example. Further, since the print area D3 includes at least a part of the pre-print areas D2, as the overlapping area D4, the print result 40 can show information different from each other by difference in area or shape of the overlapping area D4. For this reason, the printer 1 can create the print result 40 with higher information identification than a case where the print result 40 shows information by difference in color of the background color, the pre-print color and the print color. Therefore, the printer 1 can create the print result 40 with high information identification at low cost.

The pre-print layer 12 is provided between the base material 11 and the thermosensitive layer 13 in the thickness direction. According to this configuration, the thermosensitive layer 13 is a surface of the thermosensitive tape 10. For this reason, the thermal head 28 does not come into contact with the pre-print layer 12 during printing. Therefore, the printer 1 can suppress the thermal head 28 from being deteriorated.

The area of the pre-print area D2 is 25 $mm^2$. According to this configuration, the printer 1 can increase the area of the pre-print area D2 to the extent that the user can easily visually recognize the pre-print color. Therefore, the user can easily visually recognize the information by the exposed area D5 in the print result 40.

The print color satisfies both conditions of brightness≤4 and chroma≤3 in the Munsell color system. The pre-print color is a color in the Munsell color system that does not satisfy both conditions of brightness≤2 and chroma<1 and does not satisfy both conditions of brightness≥8 and chroma<1. According to this configuration, since a color difference between the print color and the pre-print color is large, the user can easily distinguish between the print color and the pre-print color.

The pre-print area D2 is located at the position apart from both ends of the thermosensitive tape 10 in the width direction, and is also located at the position apart from both ends of the thermosensitive tape 10 in the longitudinal direction. According to this configuration, even if the printer 1 cannot perform thermal printing on each end of the thermosensitive tape 10 in the width direction and the longitudinal direction, the printer 1 can suppress an area, on which the thermal printing cannot be performed, from being generated in the pre-print area D2 because there is no pre-print area D2 at each end.

The outer shape of the pre-print area D2 is rectangular, and the text area DT is also rectangular. According to this configuration the printer 1 can easily form the shape of the overlapping area D4 into a desired shape by using a filled text and a white text.

The CPU 71 generates the print data indicating text data. According to this configuration, the printer 1 can show information in the print result 40 by a combination of the pre-print color and the text.

The text is configured by the bold type. According to this configuration, the printer can increase an area of a text on the print result 40. Therefore, the user can easily identify the information by the overlapping area D4. Note that, the text may be configured by a standard type.

The font size is configured by a font size where a length of one side of the text area DT is 1.41 mm or longer. According to this configuration, the printer 1 can increase a size of the text to the extent that the user can easily visually recognize the overlapping area D4 on the print result 40. Therefore, the user can easily identify the information by the overlapping area D4. Note that, the font size may also be configured by a font size where a length of one side of the text area DT is smaller than 1.41 mm.

The CPU 71 causes the thermal head 28 to execute thermal printing, based on the image data. According to this configuration, the printer 1 can show information by a combination of the pre-print color and the image. Therefore, the printer 1 can express, for example, a shape not in the text data, in the exposed area D5 on the print result 40.

The area of the exposed area D5 is equal to the difference between the area of the pre-print area D2 and the area of the overlapping area D4, and is larger than the area of the print area D1 According to this configuration, the printer 1 can increase the area of the exposed area D5 to the extent that the user can easily visually recognize the pre-print color on the print result 40. Therefore, the user can easily visually recognize the information by the exposed area D5 on the print result 40. Note that, the area of the exposed area D5 may also be equal to or smaller than the area of the print area D3.

The present disclosure can be variously changed from the first embodiment. Note that, the following various modified embodiments can be combined with each other as long as there is no contradiction, or can also be applied to a second embodiment described later. A modified embodiment of the layer structure of the thermosensitive tape 10 is described with reference to FIG. 11. The thermosensitive tape 10 is configured by laminating the base material 11, the thermosensitive layer 13, and the pre-print layer 12 in this order in the thickness direction. Therefore, the pre-print layer 12 is provided in advance on a part of a surface 131 of the thermosensitive layer 13.

Figure 11:
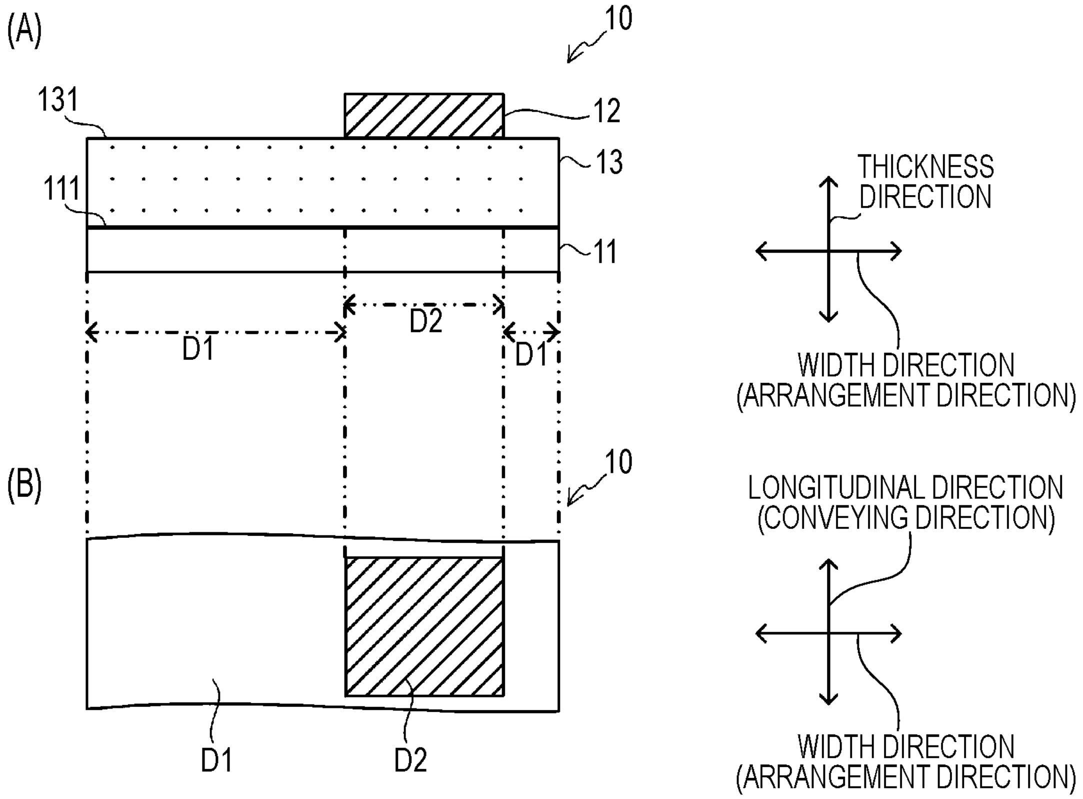
FIG. 11 is schematic diagrams showing a thermosensitive tape 10.
Figure 12:
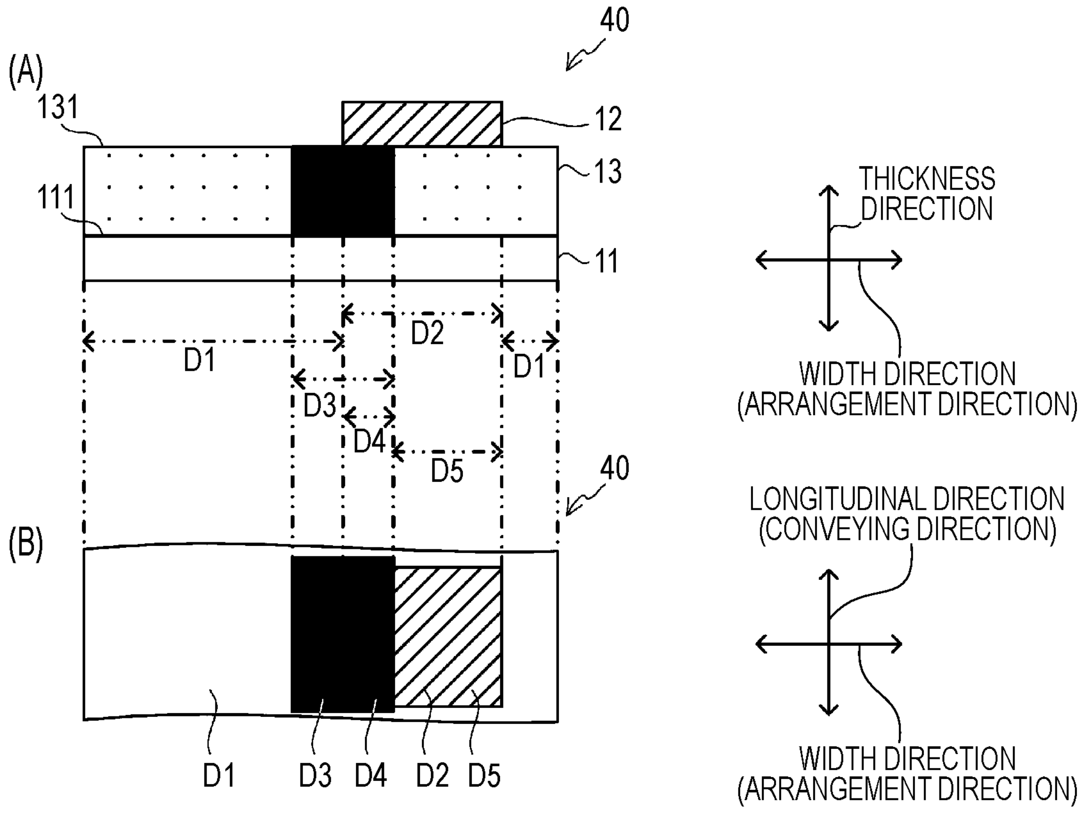
FIG. 12 is schematic diagrams showing a print result 40.

The printer 1 creates a print result 40 shown in FIG. 12 by performing thermal printing on the thermosensitive tape 10 shown in FIG. 11, based on the print data 50 shown in FIG. 6. In this case, as shown in FIG. 12, the light transmittance of the pre-print layer 12 is higher than the light transmittance of the print area of the thermosensitive layer 13 color-developed into the print color. Thereby, the specific color of the overlapping area D4 is a mixed color of the print color of the print area D3 and the pre-print color of the pre-print area D2. For example, when the print color is black, the reflectance of the print area D3 is low. For this reason, the mixed color (specific color) of the print color and the pre-print color is substantially black, regardless of the pre-print color. As a result, the specific color can be visually recognized as black. Note that, an overcoat layer for protecting the thermosensitive layer 13 may be further laminated on the thermosensitive layer 13. In this case, the pre-print layer 12 is printed on a surface of the overcoat layer opposite to the thermosensitive layer 13.

According to this configuration, for example, in a manufacturing process of the thermosensitive tape 10, it is not necessary to form the thermosensitive layer 13 after the pre-print layer 12 is printed. For this reason, the thermosensitive tape 10 is manufactured by printing the pre-print layer 12 on a ready-made product where the thermosensitive layer 13 is already provided on the base material 11. Therefore is, the printer 1 can use the low-cost thermosensitive tape 10. Further, since the pre-print layer 12 is provided on the thermosensitive layer 13, the printer 1 can prevent a tone of the pre-print color from being impaired even when the thermosensitive layer 13 is translucent.

The pre-print area D2 may include one end or both ends of the thermosensitive tape 10 in the width direction. The pre-print area D2 may include one end or both ends of the thermosensitive tape 10 in the longitudinal direction. The printer 1 may also use a thermosensitive type cut sheet, instead of the thermosensitive tape 10. The cut sheet is a sheet cut to standard dimensions. In this case, the printer 1 may convey the cut sheet by a method other than the platen roller 26. The thermosensitive tape 10 may be provided with a release sheet on a surface of the base material 11 opposite to the surface 111 in the thickness direction, via, an adhesive. The thermal head 28 is not a line head, but may also be configured to be movable in the arrangement direction with respect to the thermosensitive tape 10.

The print color may not satisfy one or both conditions of brightness≤4 and chroma≤3 in the Munsell color system. The pre-print color may satisfy both conditions of brightness≤2 and chroma<1 in the Munsell color system, or may satisfy both conditions of brightness≥8 and chroma<1. The background color may not satisfy the brightness≥7 in the Munsell color system.

The printer 1 may be configured to be able to communicate with an external device wirelessly or through a cable. The external device is a PC, a smartphone and the like. In this case, a part of the main processing may be executed by a controller of the external device. For example, the external device may execute the print data generating processing (S1) and transmit the generated print data to the printer 1. In the printer 1, the CPU 71 may acquire the print data from the external device and execute the printing processing (S3), based on the acquired print data.

A modified embodiment of the thermosensitive tape 10, the print data 50, and the print result 40 is described with reference to FIGS. 13 to 15. The printer 1 uses a thermosensitive tape 10 shown in FIG. 13, instead of the thermosensitive tape 10 shown in FIG. 6. The printer 1 performs thermal printing, based on print data 50 shown in FIG. 14, instead of the print data 50 shown in FIG. 7. Thereby, the printer 1 creates a print result 40 shown in FIG. 15, instead of the print result 40 shown in FIG. 10. In the below, differences from the first embodiment are mainly described.

Figure 13:
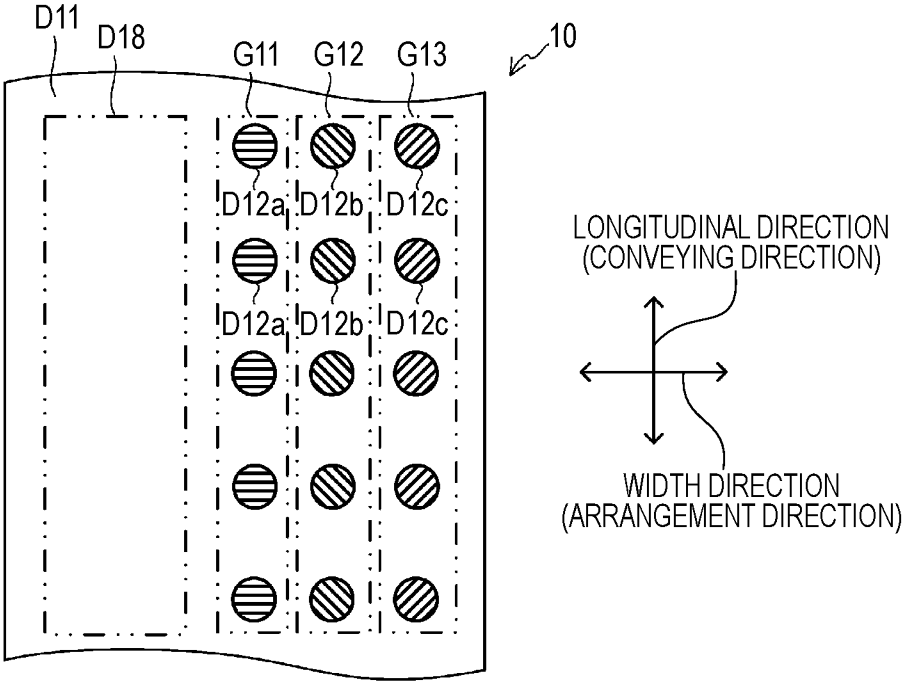
FIG. 13 is a schematic diagram showing a thermosensitive tape 10.

The thermosensitive tape 10 shown in FIG. 13 has a three-layered structure and is long, similar to the thermosensitive tape 10 shown in FIG. 5. The thermosensitive tape 10 shown in FIG. 13 is different from the thermosensitive tape 10 shown in FIG. 5 in the number, shape, and arrangement relationship of the pre-print areas.

As shown in FIG. 13, the thermosensitive tape 10 has a background area D11, a plurality of pre-print areas D12*a*, a plurality of pre-print areas D12*b*, a plurality of pre-print areas D12*c*, and a first information area D18. The plurality of pre-print areas D12*a*, the plurality of pre-print areas D12*b*, and the plurality of pre-print areas D12*c* are all arranged apart from each other. The plurality of pre-print areas D12*a* are arranged in a row at regular intervals in the longitudinal direction (i.e., in the conveying direction) to form a pre-print area group G11. Note that, the description “a plurality of areas are arranged in a specific direction” means that there is a portion where a plurality of areas overlap with each other, when seen from the specific direction.

The plurality of pre-print areas D12*a* have the same pre-print color. The plurality of pre-print areas D12*b* are arranged in a row at regular intervals in the longitudinal direction (i.e., in the conveying direction) to form a pre-print area group G12. The plurality of pre-print areas D12*b* have the same pre-print color. The plurality of pre-print areas D12*c* are arranged in a row at regular intervals in the longitudinal direction (i.e., in the conveying direction) to form a pre-print area group G13. The plurality of pre-print areas D12*c* have the same pre-print color.

The plurality of pre-print area groups G11, to G12 and G13 are arranged at regular intervals in the width direction. The pre-print color of the pre-print area D12*a*, the pre-print color of the pre-print area D12*b*, and the pre-print color of the pre-print area D12*c* are different from each other. In the below, in the L*a*b* color system, a color difference ΔE*ab between the pre-print color of the pre-print area D12*a* and the pre-print color of the pre-print area D12*b* is referred to as “first color difference”, a color difference ΔE*ab between the pre-print color of the pre-print area D12*a* and the pre-print color of the pre-print area D12*c* is referred to as “second color difference”, and a color difference ΔE*ab between the pre-print color of the pre-print area D12*b* and the pre-print color of the pre-print area D12*c* is referred to as “third color difference”. A value of the first color difference, a value of the second color difference, and a value of the third color difference are all 1.5 or greater.

The first information area D18 is provided on a side of the thermosensitive tape 10 opposite to the pre-print area group G12 with respect to the pre-print area group G11 in the width direction. The first information area D18 has a rectangular shape in a plane view and constitutes a part of the background area D1. Various information is recorded in the first information area D18.

Figure 14:
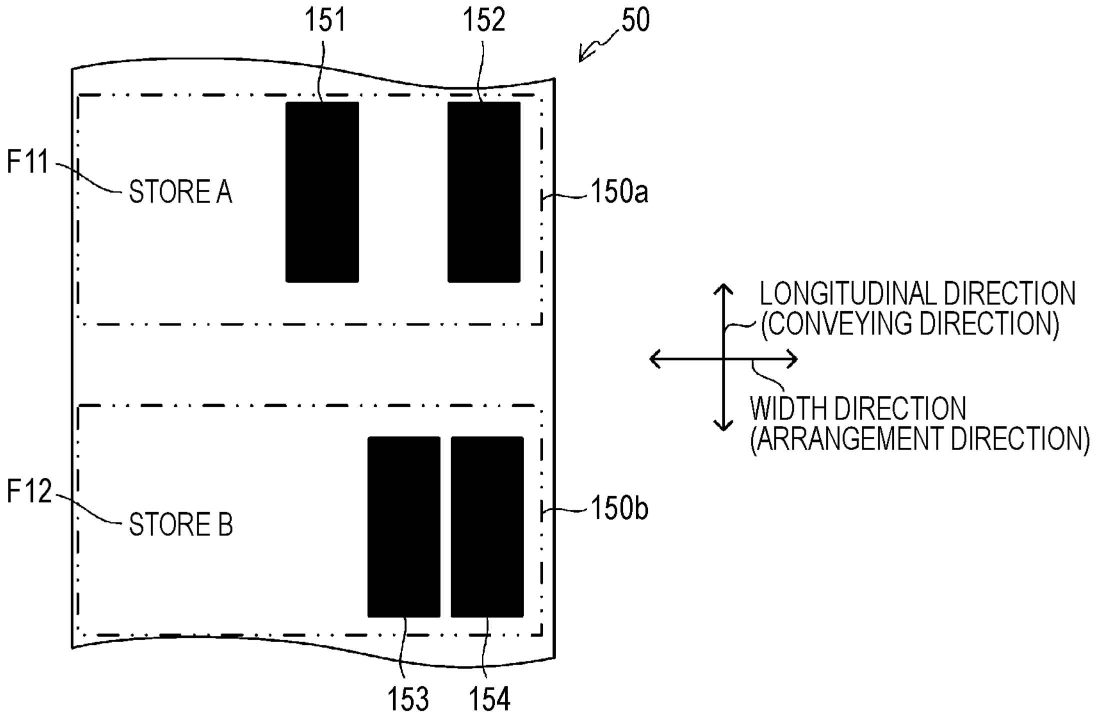
FIG. 14 is a conceptual diagram showing print data 50.
Figure 15:
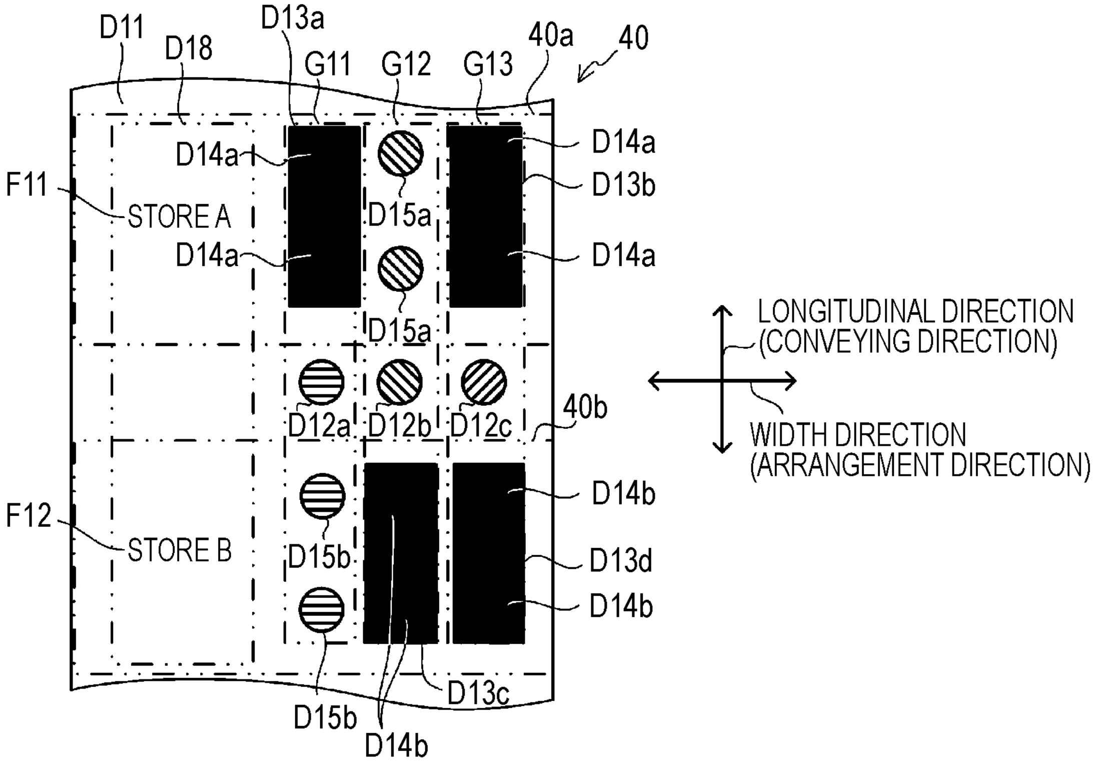
FIG. 15 is a schematic diagram showing a print result 40.

FIG. 14 shows an image of the print data 50, and shows a print element 151 corresponding to a print area D13*a* shown in FIG. 15, a print element 152 corresponding to a print area D13*b*, a print element 153 corresponding to a print area D13*c*, and a print element 154 corresponding to a print area D13*d* in black paint. The print data 50 includes print data 50*a* and 50*b*. The print data 50*a* includes the print elements 151 and 152 and correspondence information F11. The print data 50*b* includes the print elements 153 and 154 and correspondence information F12. The correspondence information Fit and F12 are each configured by the print elements, and are thermally printed in the first information area D18 shown in FIG. 13 by the printing processing (S3) shown in FIG. 10. The details of the correspondence information F11 and F12 will be described later.

Figure 10:
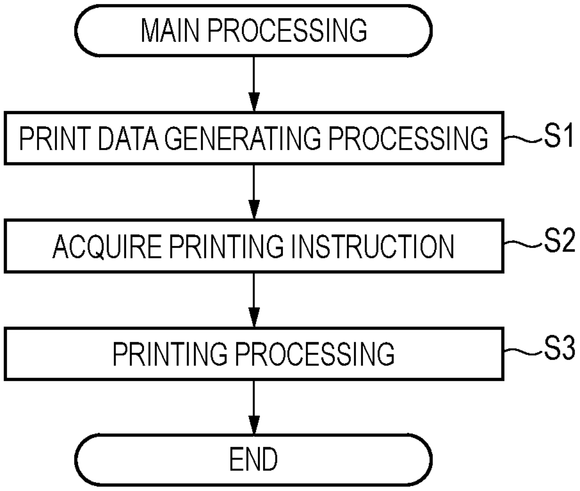
FIG. 10 is a flowchart showing main processing.

The printer 1 creates a print result 40 shown in FIG. 15 by performing thermal printing on the thermosensitive tape 10 shown in FIG. 13, based on the print data 50 shown in FIG. 14, by the printing processing (S3) shown in FIG. 10. Specifically, the printer 1 creates a print result 40*a* shown in FIG. 15 by performing thermal printing on the thermosensitive tape 10 shown in FIG. 13, based on the print data 50*a* shown in FIG. 14. The printer 1 creates a print result 40*b* shown in FIG. 15 by performing thermal printing on the thermosensitive tape 10 shown in FIG. 13, based on the print data 50*b* shown in FIG. 14.

As shown in FIG. 15, the print result 40 includes the print results 40*a* and 40*b*. The print results 40*a* and 40*b* are arranged in the longitudinal direction. For example, the user divides the print result 40 into the print result 40*a* and the print result 40*b*, and uses the print result 40*a* and the print result 40*b*.

The print area D13*a* has a rectangular shape and is larger than each of the plurality of pre-print areas D12*b*, and more specifically, is larger than the two pre-print areas D12*b*. The print area D13*a* surrounds all of the two pre-print areas D12*a* shown in FIG. 13 in the print result 40*a*. The print area D13*b* has a rectangular shape and is larger than each of the plurality of pre-print areas D12*c*, and more specifically, is larger than the two pre-print areas D12*c*. The print area D13*b* surrounds all of the two pre-print areas D12*c* shown in FIG. 13 in the print result 40*a*.

According to this configuration, in the print result product 40*a*, all of the pre-print areas D12*a* and D12*c* are covered and hidden by the print areas D13*a* and D13*b*. That is, in the print result 40*a*, all of the two pre-print areas D12*a* and all of the two pre-print areas D12*c* are associated with an overlapping area D14*a*, and all of the two pre-print areas D12*b* are associated with an exposed area D15*a*.

The print area D13*c* has a rectangular shape and is larger than each of the plurality of pre-print areas D12*a*, and more specifically, is larger than the two pre-print areas D12*a*. The print area D13*c* surrounds all of the two pre-print areas D12*b* shown in FIG. 13 in the print result 40*b*. The print area D13*d* has a rectangular shape and is larger than each of the plurality of pre-print areas D12*c*, and more specifically, is larger than the two pre-print areas D12*c*. The print area D13*d* surrounds all of the two pre-print areas D12*d* shown in FIG. 13 in the print result 40*b*.

According to this configuration, in the print result 40*b*, all of the pre-print areas D12*b* and D12*c* shown in FIG. 13 are covered and hidden by the print areas D13*c* and D13*d*. That is, in the print result 40*b*, all of the two pre-print areas D12*b* and all of the two pre-print areas D12*c* are associated with an overlapping area D14*b*, and all of the two pre-print areas D12*a* are associated with an exposed area D15*b*.

The correspondence information F11 corresponds to the print result 40*a*. The correspondence information F11 indicates information corresponding to the pre-print color of the pre-print area D12*b*, which is the exposed area D15*a*, among the plurality of pre-print areas D12*a*, D12*b* and D12*c*. As an example, the correspondence information F11 indicates that the pre-print color of the pre-print area D12*b* corresponds to the information of “STORE A”.

The correspondence information F12 corresponds to the print result 40*b*. The correspondence information F12 indicates information corresponding to the pre-print color of the pre-print area D12*a*, which is the exposed area D15*b*, among the plurality of pre-print areas D12*a*, D12*b* and D12*c*. As an example, the correspondence information F12 indicates that the pre-print color of the pre-print area D12*a* corresponds to the information of “STORE B”.

As described above, the thermosensitive tape 10 has the first information area D18. For this reason, the printer 1 can show information by the first information area D18 in the print result 40, in addition to the information indication by the exposed areas D15*a* and D15*b*.

The correspondence information F11 and F12 is thermally printed in the first information area D18 in the printing processing. Therefore, the user can easily identify the information by the exposed areas D15*a* and D15*b* by seeing the correspondence information F11 and F12 in the first information area D18 in the print result 40.

Note that, the correspondence information F11 and F12 may also be printed in advance in the first information area D18. According to this configuration, the user can easily identify the information by the exposed areas D15*a* and D15*b* by seeing the correspondence information F11 and F12 in the first information area D18 in the print result 40.

The plurality of pre-print areas D12*a*, the plurality of pre-print areas D12*b*, and the plurality of pre-print areas D12*c* are all arranged apart from each other. According to this configuration, for example, even when the print area D13*a* actually thermally printed deviates from a target print area, the printer 1 can suppress the deviating print area D13*a* from overlapping with the pre-print area D12*b* or the pre-print area D12*c*. In this way, the printer 1 can suppress the print areas D13*a*, D13*b*, D13*c* and D13*d* from overlapping with a pre-print area different from a pre-print area with which the target print area overlaps.

Note that, the pre-print area D12*b* and the pre-print area D12*c* may be arranged adjacent to each other without a gap. According to this configuration, the plurality of pre-print areas D12*a*, D12*b* and D12*c* are arranged more closely than they are arranged apart from each other. Therefore, the printer 1 can suppress an increase in size of the thermosensitive tape 10.

The value of the first color difference, the value of the second color difference, and the value of the third color difference are all 1.5 or greater. According to this configuration, the printer 1 can increase the first color difference, the second color difference and the third color difference to the extent that the user can easily visually recognize the difference of the pre-print color of the pre-print area D12*a*, the pre-print color of the pre-print area D12*b* and the pre-print color of the pre-print area D12*c*. Therefore, the printer 1 can suppress the user from confusing the pre-print color of the pre-print area D12*a*, the pre-print color of the pre-print area D12*b* and the pre-print color of the pre-print area D12*c* with each other in the print result 40. Note that, any one or two of the value of the first color difference, the value of the second color difference, and the value of the third color difference may also be 1.5 or greater and any other one or two may also be smaller than 1.5. The value of the first color difference, the value of the second color difference, and the value of the third color difference may also be all smaller than 1.5.

The plurality of pre-print areas D12*a* are arranged each other in the conveying direction and have the same pre-print color. The plurality of pre-print areas D12*b* are arranged each other in the conveying direction and have the same pre-print color. The plurality of pre-print areas D12*c* are arranged each other in the conveying direction and have the same pre-print color. According to this configuration, for example, even when the thermosensitive tape 10 is divided between the print result 40*a* and the print result 40*b* in the conveying direction, the printer 1 can show information by the same pre-print area configuration in the two print results 40*a* and 40*b*.

For example, the print area D13*a* is larger than the pre-print area D12*a* and surrounds the entire pre-print area D12*a*. According to this configuration, even when the print area D13*a* actually thermally printed deviates from the target print area D13*a*, the printer 1 can suppress that the deviating print area D13*a* does not overlap with the pre-print area D12*a*. Note that, for example, the print area D13*a* may also be smaller than the two pre-print areas D12*b* and may also be smaller than each of the plurality of pre-print areas D12*b*. The print area D13*a* may also be included in the pre-print area D12*b* without surrounding the entire pre-print area D12*a*.

In the printing processing, the CPU 71 causes the thermal head 28 to execute thermal printing, with the print color, on the print area including at least one or two of at least a part of the pre-print area D12*a*, at least a part of the pre-print area D12*b*, and at least a part of the pre-print area D12*c* of the thermosensitive tape 10. According to this configuration, the thermal printing is not performed on any one or two of the pre-print area D12*a*, the pre-print area D12*b* and the pre-print area D12*c* of the thermosensitive tape 10. That is, the entire area of any one or two of the pre-print area D12*a*, the pre-print area D12*b* and the pre-print area D12*c* of the thermosensitive tape 10 are associated with an exposed area. Therefore, the user can easily identify the information by the pre-print area whose entire area is associated with the exposed area.

Figure 16:
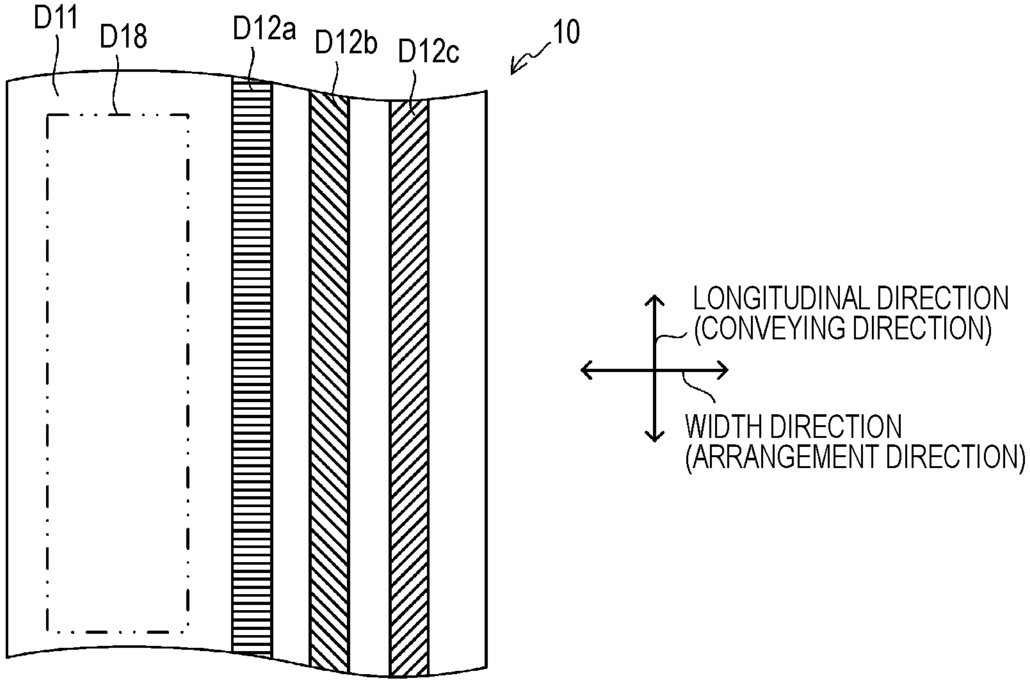
FIG. 16 is a schematic diagram showing a thermosensitive tape 10.

Note that, as shown in FIG. 16, the thermosensitive tape 10 may have a background area D11, a pre-print area D12*a*, a pre-print area D12*b*, a pre-print area D12*c*, and a first information area D18. The thermosensitive tape 10 shown in FIG. 16 is different from the thermosensitive tape 10 shown in FIG. 13, in that it has one pre-print area D12*a*, one pre-print area D12*b* and one pre-print area D12*c*.

The pre-print area D12*a*, the pre-print area D12*b* and the pre-print area D12*c* are all arranged at intervals in the width direction. Note that, the pre-print area D12*a*, the print area D12*b* and the pre-print area D12*c* may also be arranged adjacent to each other without a gap in the width direction. The pre-print area D11*a* extends continuously in the longitudinal direction (i.e., the conveying direction). The pre-print area D12*b* extends continuously in the longitudinal direction. The pre-print area D12*c* extends continuously in the longitudinal direction. The pre-print color of the pre-print area D12*a*, the pre-print color of the pre-print area D12*b*, and the pre-print color of the pre-print area D12*c* are different from each other. Note that, a part or all of the pre-print color of the pre-print area D12*a*, the pre-print color of the pre-print area D12*b*, and the pre-print color of the pre-print area D12*c* may be the same each other.

According to this configuration, since each of the plurality of pre-print areas D12*a*, D12*b* and D12*c* extends continuously in the longitudinal direction, the printer 1 can show information by the same pre-print area configuration in the print result at any position in the longitudinal direction of the thermosensitive tape 10, for example. For example, even when the size of the print result in the longitudinal direction is changed, the printer 1 can show information by the same pre-print area configuration in the print result.

Figure 17:
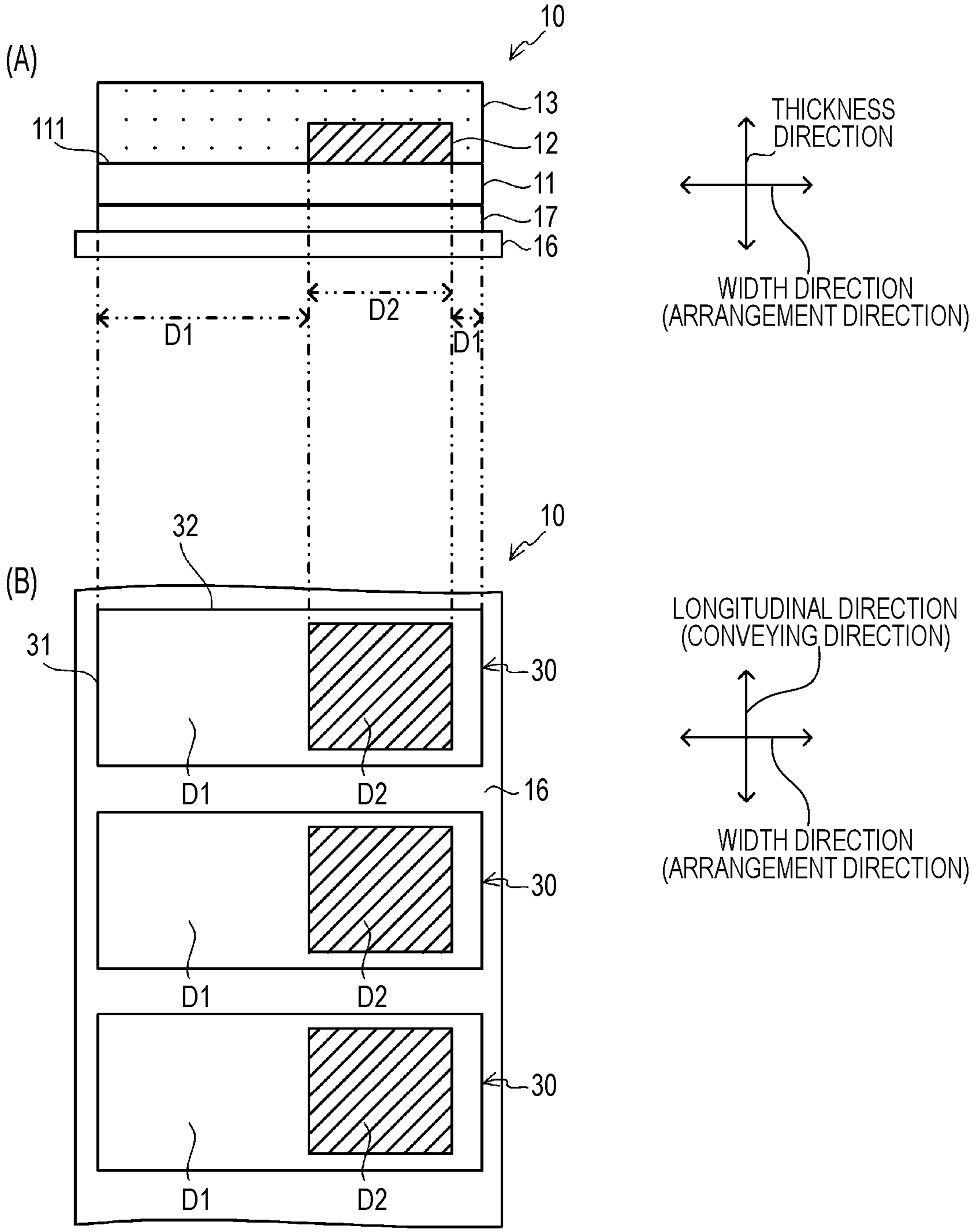
FIG. 17 is schematic diagrams showing a thermosensitive tape 10.

A second embodiment is described with reference to FIG. 17. In the below, the differences between the second embodiment and the first embodiment are mainly described. The mechanical configuration and electrical configuration of the printer 1 of the second embodiment are the same as the mechanical configuration and electrical configuration of the printer 1 of the first embodiment. The printer 1 of the second embodiment is different from the first embodiment, in that a thermosensitive tape 10 shown in FIG. 17 is used instead of the thermosensitive tape 10 shown in FIG. 6. That is, in the second embodiment, the printer 1 creates a print result by performing thermal printing on the thermosensitive tape 10 shown in FIG. 17 in the printing processing (S3) shown in FIG. 10.

As shown in view (A) of FIG. 17, the thermosensitive tape 10 is configured by attaching a thermosensitive label 30 to a release sheet 16 via an adhesive layer 17. The release sheet 16 extends in the longitudinal direction. The thermosensitive label 30 has a base material 11, a pre-print layer 12, and a thermosensitive layer 13. The base material 11, the pre-print layer 12, and the thermosensitive layer 13 are laminated in this order in the thickness direction. In the thermosensitive label 30, the thermosensitive layer 13-side with respect to the base material 11 in the thickness direction is a printing surface.

As shown in view (B) of FIG. 17, the thermosensitive label 30 is a die-cut label. On the release sheet 16, the thermosensitive label 30 is cut into a predetermined size, and a plurality of the thermosensitive labels are arranged in the longitudinal direction. The thermosensitive label 30 has a rectangular shape in a plane view and has a short side 31 and a long side 32. In the view (B) of FIG. 17, as an example, the short side 31 extends in the longitudinal direction and the long side 32 extends in the width direction. The long side 32 is longer than the short side 31. Note that, the short side 31 may extend in the width direction (arrangement direction), and the long side 32 may also extend in the longitudinal direction (conveying direction). The length of the short side 31 and the length of the long side 32 may also be the same. Each of the plurality of thermosensitive labels 30 has both a background area D1 and a pre-print area D2. The pre-print area D2 is apart from both ends of the thermosensitive label 30 in the width direction, and is also apart from both ends of the thermosensitive label 30 in the longitudinal direction. An area of the pre-print area D2 is 25 $mm^2$ or greater, and is smaller than an entire area of the printing surface of the thermosensitive label 30.

Similar to the first embodiment, in the second embodiment, the CPU 71 executes the main processing shown in FIG. 10, so that the printer 1 can create a print result 40 with high information identification at low cost.

The present disclosure can be variously changed from the second embodiment. Note that, the following various modified embodiments can be combined with each other as long as there is no contradiction, or can also be applied to the first embodiment described above. A variety of modified embodiments of the pre-print area are described with reference to FIGS. 18A to 20C. In the below, differences from the thermosensitive label 30 of the second embodiment are mainly described. The thermosensitive labels 30 shown in FIGS. 18A to 18D, FIGS. 19A and 19B, and FIGS. 20A to 20C each include a plurality of pre-print areas and are mainly different from the thermosensitive label 30 of the second embodiment, in arrangement positions or shapes of the plurality of pre-print areas.

Figure 18A:
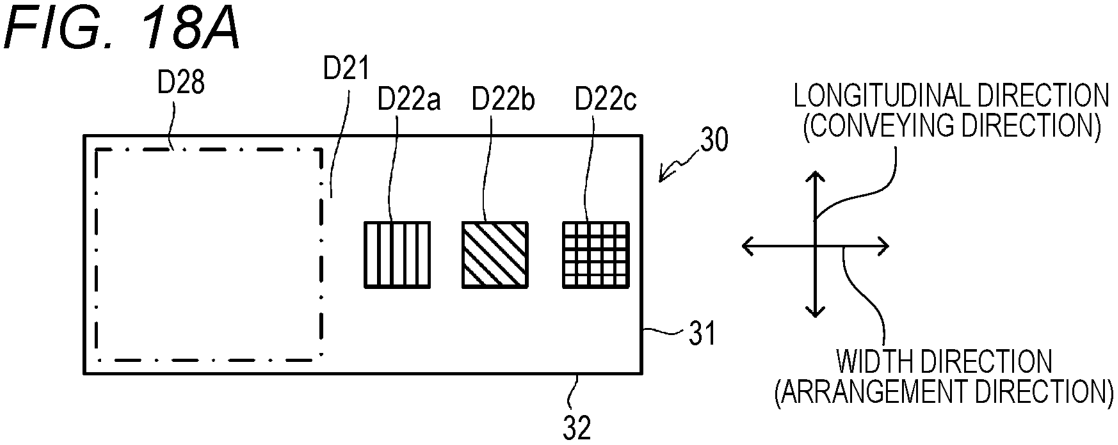
FIGS. 18A to 18D are schematic diagrams showing a thermosensitive label 30.

As shown in FIG. 18A, the thermosensitive label 30 has a background area D21, a first information area D28, and a plurality of pre-print areas D22*a*, D22*b* and D22*c*. The respective pre-print colors of the plurality of pre-print areas D22*a*, D22*b* and D22*c* are different from each other, Note that, a part or all of the respective pre-print colors of the plurality of pre-print areas D22*a*, D22*b* and D22*c* may be the same each other. The plurality of pre-print areas D22*a*, D22*b* and D22*c* are arranged along the long side 32 in the width direction, i.e., in the arrangement direction. The number of the plurality of pre-print areas is not limited to three. When the length of the long side 32 is denoted as X mm and the number of the plurality of pre-print areas arranged in the width direction is Y (for example, 3), X/Y≥1.4 is satisfied. Note that, X/Y<1.4 is also possible. The first information area D28 is arranged on a side opposite to the pre-print area D22*b* with respect to the pre-print area D22*a* in the width direction.

According to this configuration, since X/Y≥1.4 is satisfied, the printer 1 can increase the areas of the pre-print areas D22*a*, D22*b* and D22*c* per an area of the thermosensitive label 30. Therefore, the user can easily visually recognize the information by the pre-print areas D22*a*, D22*b* and D22*c* in the print result.

For example, the user may place the print result at a corner of a target object. In this case, since the pre-print areas D22*a*, D22*b* and D22*c* are arranged in the width direction, the user is likely to arrange the print result at the corner of the target object so that both sides of the pre-print areas D22*a*, D22*b* and D22*c* can be seen from one direction. Therefore, the user can easily identify the information by the pre-print areas D22*a*, D22*b* and D22*c* in the print result.

Since the pre-print areas D22*a*, D22*b* and D22*c* are arranged in the width direction, the printer 1 can make the heat generated by the plurality of heat generators 281 uniform in the arrangement direction. Therefore, the printer 1 can suppress the thermal head 28 from being deteriorated.

Figure 18B:
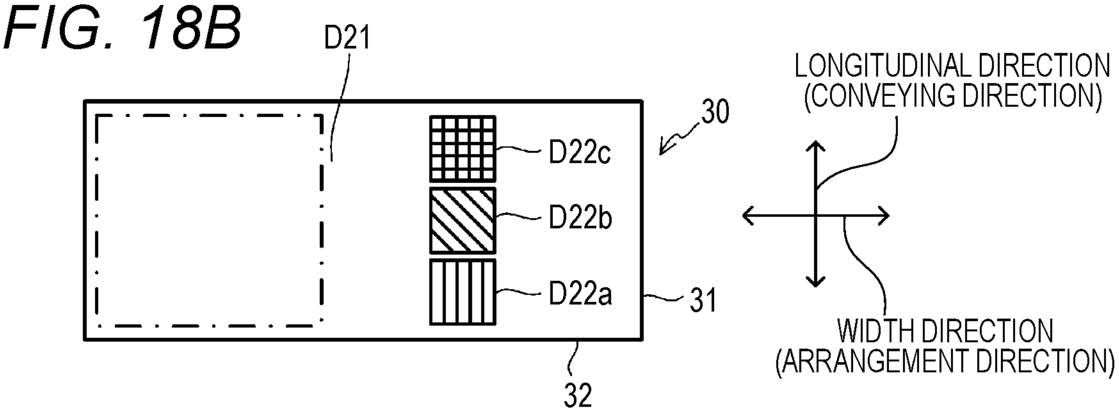

As shown in FIG. 18B, the thermosensitive label 30 has a background area D21, a first information area D28, and a plurality of pre-print areas D22*a*, D22*b* and D22*c*. The respective pre-print colors of the plurality of pre-print areas D22*a*, D22*b* and D22*c* are different from each other. Note that, a part or all of the respective pre-print colors of the plurality of pre-print areas D22*a*, D22*b* and D22*c* may be the same each other. The plurality of pre-print areas D22*a*, D22*b* and D22*c* are arranged along the short side 31 in the length direction, i.e., in the conveying direction. The number of the plurality of pre-print areas is not limited to three. When the length of the short side 31 is denoted as X mm and the number of the plurality of pre-print areas arranged in the longitudinal direction is Y (for example, 3), X/Y≥1.4 is satisfied. Note that, X/Y<1.4 is also possible. The first information area D28 is arranged with the pre-print areas D22*a*, D22*b* and D22*c* in the width direction.

According to this configuration, since X/X≥1.4 is satisfied, the printer 1 can increase the areas of the pre-print areas D22*a*, D22*b* and D22*c* per an area of the thermosensitive label 30. Therefore, the user can easily visually recognize the information by the pre-print areas D22*a*, D22*b* and D22*c* in the print result.

For example, the user may place the print result at a corner of a target object. In this case, since the pre-print areas D22*a*, D22*b* and D22*c* are arranged in the longitudinal direction, the user is likely to arrange the print result at the corner of the target object so that both sides of the pre-print areas D22*a*, D22*b* and D22*c* can be seen from one direction. Therefore, the user can easily identify the information by the pre-print areas D22*a*, D22*b* and D22*c* in the print result.

Since the pre-print areas D22*a*, D22*b* and D22*c* are arranged in the longitudinal direction, the printer 1 can suppress the increase in size of the thermosensitive label 30 in the width direction. Therefore, the printer 1 can suppress the increase in size of the thermal head 28 in the arrangement direction.

Figure 18C:
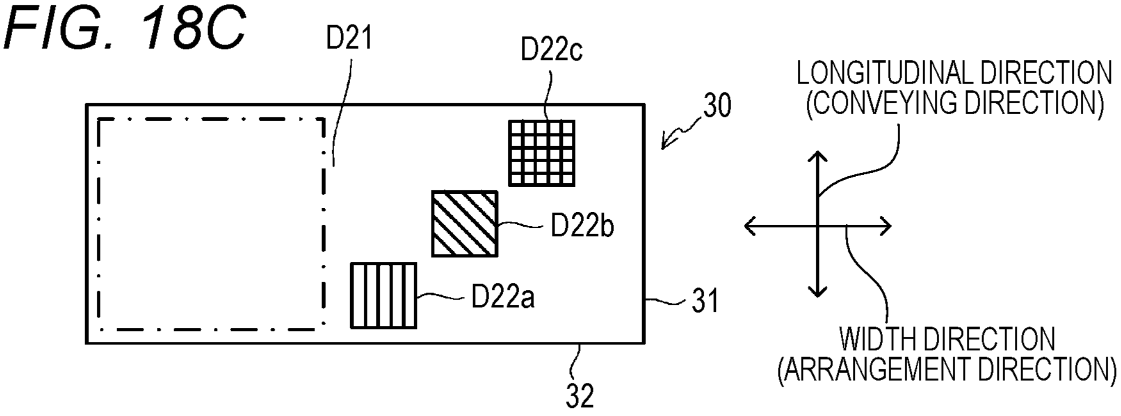

As shown in FIG. 18C, the thermosensitive label 30 has a background area D21, a first information area D28, and a plurality of pre-print areas D22*a*, D22*b* and D22*c*. The respective pre-print colors of the plurality of pre-print areas D22*a*, D22*b* and D22*c* are different from each other. Note that, a part or all of the respective pre-print colors of the plurality of pre-print areas D22*a*, D22*b* and D22*c* may be the same each other. The number of the plurality of pre-print areas is not limited to three. The pre-print area D22*b* is arranged at a position offset from the pre-print area D22*a* in one width direction and one longitudinal direction. The pre-print area D22*c* is arranged at a position offset from the pre-print area D22*b* in one width direction and one longitudinal direction. The plurality of pre-print areas D22*a*, D22*b* and D22*c* are arranged at positions offset from each other in both the longitudinal direction and the width direction. The first information area D28 is arranged with the pre-print areas D22*a*, D22*b* and D22*c* in the width direction.

According to this configuration, since the plurality of pre-print areas D22*a*, D22*b* and D22*c* are arranged at positions offset from each other in both the longitudinal direction and the width direction, the thermal printing on the pre-print area D22*a*, the thermal printing on the pre-print area D22*b* and the thermal printing on the pre-print area D22*c* in the printing processing are temporally shifted. For this reason, the printer 1 can suppress the local increase in drive energy of the thermal head 28.

Figure 18D:
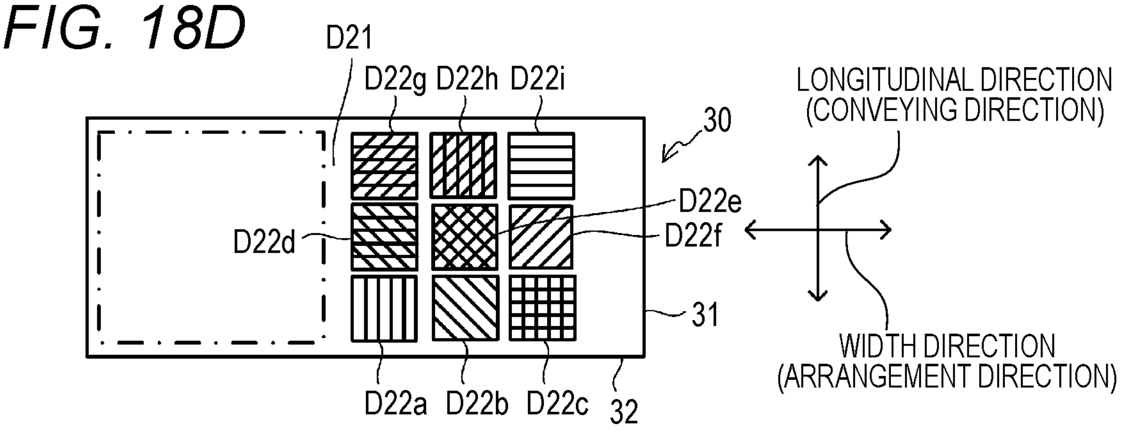

As shown in FIG. 18D, the thermosensitive label 30 has a background area D21, and a plurality of pre-print areas D22*a*, D22*b*, D22*c*, D22*d*, D22*e*, D22*f*, D22*g*, D22*h* and D22*i*. The plurality of pre-print areas D22*a*, D22*b*, D22*c*, D22*d*, D22*e*, D22*f*, D22*g*, D22*h* and D22*i* are arranged in a grid pattern of 3 columns×3 rows. Note that, the number of columns and the number of rows in a grid pattern are not limited to 3×3.

The respective pre-print colors of the plurality of pre-print areas D22*a*, D22*b* and D22*c* are different from each other. The pre-print color of the pre-print area D22*a* is the same type of color as the pre-print color of the pre-print area D22*i*, and is not the same type of color as the pre-print colors of the pre-print areas D22*b*, D22*c*, D22*d*, D22*e*, D22*f*, D22*g* and D22*h*.

Note that, in the present embodiment, it is said that a first color and a second color have a relationship of the same type of color each other in the following three cases. That is, in a case where the first color is included in the range of 5RP, 5R and 5YR of the 10 major hues in the Munsell color system and the second color is included in the range of 5GY, 5G and 5GB of the 10 major hues in the Munsell color system, it is said that the first color and the second color have a relationship of the same type of color each other. In a case where both the first color and the second color are included in the range of 5GY, 5G, 5GB, 5B and 5PB, it is said that the first color and the second color have a relationship of the same type of color each other, in a case where the first hue and the second hue of the 10 major hues in the Munsell color system are adjacent to each other, when both the first color and the second color are included in the range of the first hue or the second hue, it is said that the first color and the second color have a relationship of the same type of color each other.

The pre-print area D22*a* is arranged at a corner in a grid pattern configured by the plurality of pre-print areas D22*a*, D22*b*, D22*c*, D22*d*, D22*e*, D22*f*, D22*g*, D22*h* and D22*i*. The pre-print area D22*i* is arranged at a corner diagonal to the pre-print area D22*a* in the grid pattern configured by the plurality of pre-print areas D22*a*, D22*b*, D22*c*, D22*d*, D22*e*, D22*f*, D22*g*, D22*h* and D22*i*.

According to this configuration, the printer 1 can make a distance between the pre-print area D22*a* and the pre-print area D22*i* larger than a distance between the pre-print area D22*a* or the pre-print area D22*i* and another printed area. Therefore, even when the pre-print color of the pre-print area D22*a* and the pre-print color of the pre-print area D22*i* are the same type of color each other, the printer 1 can suppress the user from confusing the pre-print color of the pre-print area D22*a* and the pre-print color of the pre-print area D22*i* each other in the print result 40.

Figure 19A:
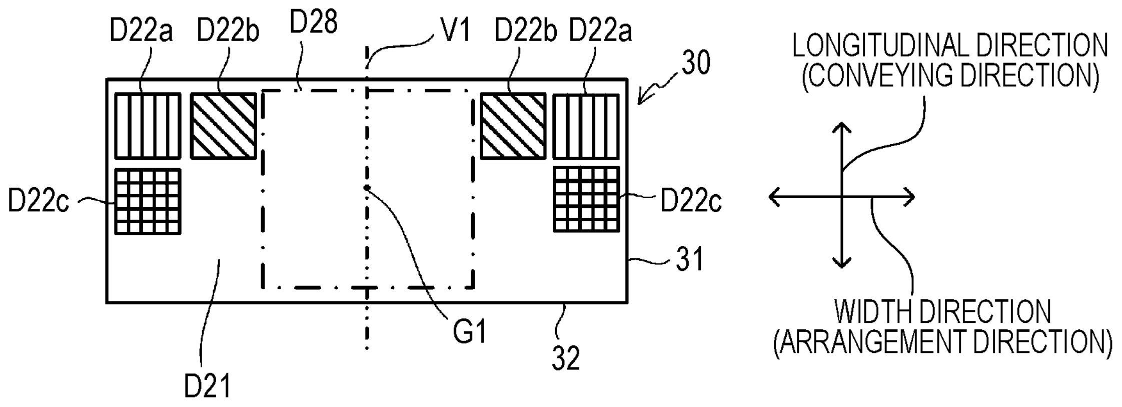
FIGS. 19A and 19B are schematic diagrams showing a thermosensitive label 30.

As shown in FIG. 19A, the thermosensitive label 30 has a background area D21, a first information area D28, a pair of pre-print areas D22*a*, a pair of pre-print areas D22*b* and a pair of pre-print areas D22*c*. The respective pre-print colors of the pre-print area D22*a*, the pre-print area D22*b* and the pre-print area D22*c* are different from each other. Note that, a part or all of the respective pre-print colors of the pre-print area D22*a*, the pre-print area D22*b* and the pre-print area D22*c* may also be the same each other.

A virtual line V1 passes through a bar center G1 of the thermosensitive label 30 and extends in the width direction. Note that, the virtual line V1 may pass through the barycenter G1 and extend in the longitudinal direction, or may extend so as to intersect both the longitudinal direction and the width direction. The first information area D28 is arranged at a central part of the thermosensitive label 30, and a barycenter of the first information area D28 coincides with the barycenter G1 of the thermosensitive label 30. The first information area D28 has a line-symmetrical shape with respect to the virtual line V1. The pair of pre-print areas D22*a* is located on one side and the other side of the first information area D28 in the width direction, and are arranged at line-symmetrical positions with respect to the virtual line V1. The pair of pre-print areas D22*b* is located on one side and the other side of the first information area D28 in the width direction, and are arranged at line-symmetrical positions with respect to the virtual line V1. The pair of pre-print areas D22*c* is located on one side and the other side of the first information area D28 in the width direction, and are arranged at line-symmetrical positions with respect to the virtual line V1. Therefore, the thermosensitive label 30 is line-symmetrical with respect to the virtual line V1 as a whole.

For example, the user may place the print result at a corner of a target object. In this case, since each of the pair of pre-print areas D22*a*, the pair of pre-print areas D22*b* and the pair of pre-print areas D22*c* is arranged at line-symmetrical positions with respect to the virtual line V1, the user is likely to arrange the print result at the corner of the target object so that one group of the pre-print areas D22*a*, D22*b* and D22*c* can be seen from one direction and the other group of the pre-print areas D22*a*, D22*b* and D22*c* can be seen from the other direction. Therefore, for example, when thermal printing is performed so as to be line-symmetrical with respect to the virtual line V1, the user can identify the same information of information by one group of the pre-print areas D22*a*, D22*b* and D22*c* and information by the other group of the pre-print areas D22*a*, D22*b* and D22*c* in the print result, from the two directions.

Figure 19B:
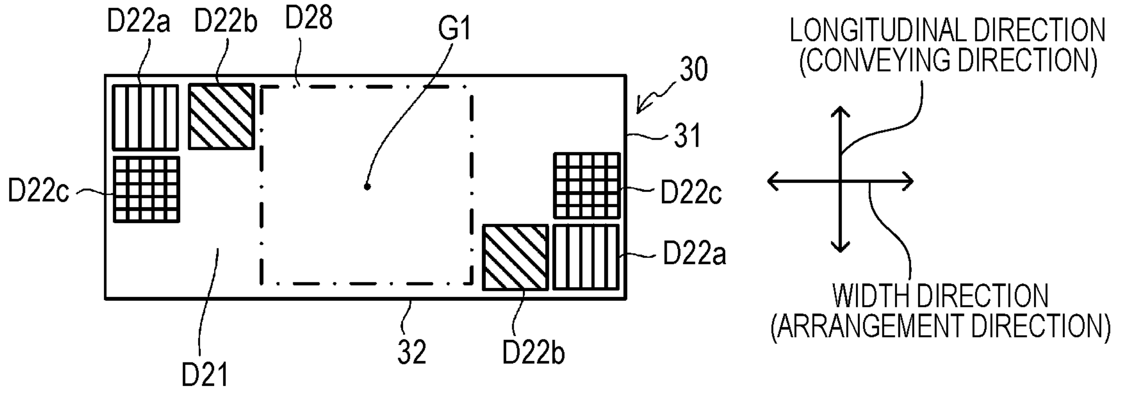

As shown in FIG. 19B, the thermosensitive label 30 has a background area D21, a first information area D28, a pair of pre-print areas D22*a*, a pair of pre-print areas D22*b* and a pair of pre-print areas D22*c*. The respective pre-print colors of the pre-print area D22*a*, the pre-print area D22*b* and the pre-print area D22*c* are different from each other. Note that, a part or all of the respective pre-print colors of the pre-print area D22*a*, the pre-print area D22*b* and the pre-print area D22*c* may also be the same each other.

The first information area D28 is arranged at a central part of the thermosensitive label 30, and the barycenter of the first information area D28 coincides with the barycenter G1 of the thermosensitive label 30. The first information area D28 has a point-symmetrical shape with respect to the virtual line G1. The pair of pre-print areas D22*a* is located on one side and the other side of the first information area D28 in the width direction, and is arranged at point-symmetrical positions with respect to the virtual line G1. The pair of pre-print areas D22*b* is located on one side and the other side of the first information area D28 in the width direction, and is arranged at point-symmetrical positions with respect to the virtual line G1. The pair of pre-print areas D22*c* is located on one side and the other side of the first information area D28 in the width direction, and is arranged at point-symmetrical positions with respect to the virtual line G1. Therefore, the thermosensitive label 30 is point-symmetrical with respect to the virtual line G1 as a whole.

For example, the user may place the print result at a corner of a target object. In this case, since each of the pair of pre-print areas D22*a*, the pair of pre-print areas D22*b* and the pair of pre-print areas D22*c* is arranged at point-symmetrical positions with respect to the virtual line G1, the user is likely to arrange the print result at the corner of the target object so that one group of the pre-print areas D22*a*, D22*b* and D22*c* can be seen from one direction and the other group of the pre-print areas D22*a*, D22*b*, D22*c* can be seen from the other direction. Therefore, for example, when thermal printing is performed so as to be line-symmetrical with respect to the virtual line V1, the user can identify the same information of information by one group of the pre-print areas D22*a*, D22*b* and D22*c* and information by the other group of the pre-print areas D22*a*, D22*b* and D22*c* in the print result, from the two directions.

Figure 20A:
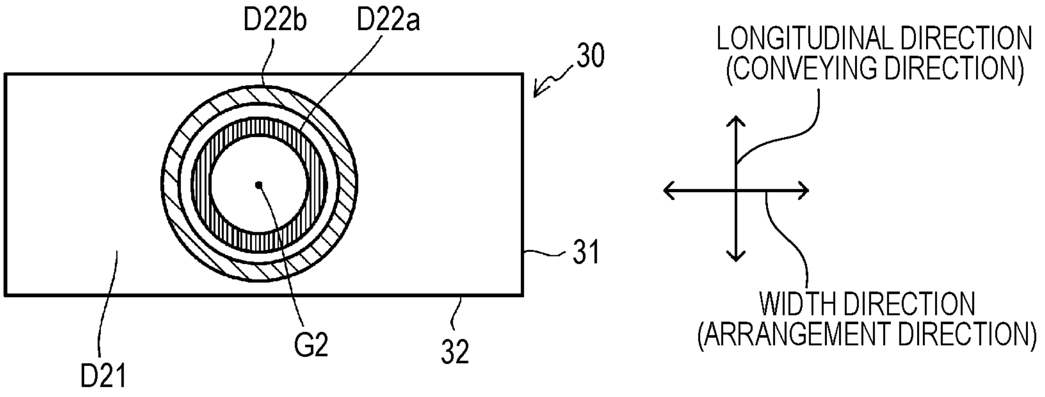
FIGS. 20A to 20C are schematic diagrams showing a thermosensitive label 30.

As shown in FIG. 20A, the thermosensitive label 30 has a background area D21 and a plurality of pre-print areas D22*a* and D22*b*. The respective pre-print colors of the plurality of pre-print areas D22*b* and D22*c* are different from each other. Note that, a part or all of the respective pre-print colors of the plurality of pre-print areas D22*b* and D22*c* may be the same each other. The shapes of the pre-print areas D22*a* and D22*b* are hollow ring shapes, respectively. A barycenter G2 of the pre-print area D22*a* and a barycenter G2 of the pre-print area D22*b* coincide with each other. An inner diameter of the pre-print area D22*b* is larger than an outer diameter of the pre-print area D22*a*. In this case, for example, thermal printing is performed so that any one of the pre-print areas D22*a* and D22*b* entirely overlaps with the print area by printing processing. Note that, as long as the respective centers of gravity of the plurality of pre-print areas D22*a* and D22*b* coincide with each other, the shapes of the pre-print areas may be a hollow polygonal shape such as a triangle or a quadrangle, or may be a hollow elliptical shape.

It is assumed that the user sees the pre-print area with the barycenter of the pre-print area in the print result as a center of the viewpoint. In this case, since the barycenter G2 of the pre-print area D22*a* and the barycenter G2 of the pre-print area D22*b* coincide with each other, the user does not have to shift the viewpoint when seeing the pre-print area D22*a* and when seeing the pre-print area D22*b* in the print result. Therefore, the user can easily identify the information by the pre-print areas D22*a* and the information by the pre-print area D22*b* in the print result.

Figure 20B:
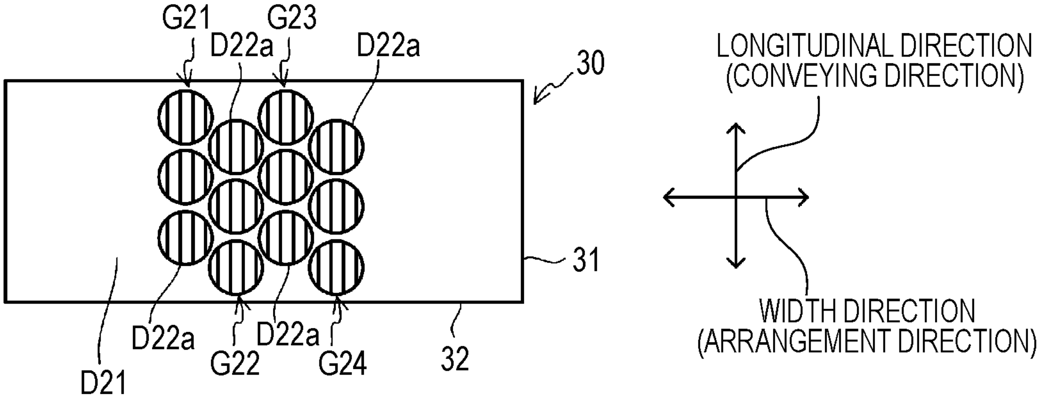

As shown in FIG. 20B, the thermosensitive label 30 has a background area D21 and a plurality of pre-print areas D22*a*. The plurality of pre-print areas D22*a* are arranged in the longitudinal direction and form pre-print area groups G21, G22, G23 and G24. The plurality of pre-print areas D22*a* have the same pre-print color. Note that, a part or all of the respective pre-print colors of the plurality of pre-print areas D22*a* may be different from each other. The plurality of pre-print areas D22*a* each have a circular shape. Note that, the plurality of pre-print areas D22*a* may each have an elliptical shape, or may have a hollow ring shape as long as the outer shape of each of the plurality of pre-print areas D22*a* has a circular shape or an elliptical shape.

The pre-print area groups G21, G22, G23 and G24 are arranged in the width direction and are arranged in a zigzag pattern each other. In the pre-print area group G21, ends on one side, in the width direction, of the plurality of pre-print areas D22*a* are located on one side in the width direction further than ends on the other side, in the width direction, of the plurality of pre-print areas D22*a* in the pre-print area group G22, in the pre-print area group G22, ends on one side, in the width direction, of the plurality of pre-print areas D22*a* are located on one side in the width direction further than ends on the other side, in the width direction, of the plurality of pre-print areas D22*a* in the pre-print area group G23. In the pre-print area group G23, ends on one side, in the width direction, of the plurality of pre-print areas D22*a* are located on one side in the width direction further than ends on the other side, in the width direction, of the plurality of pre-print areas D22*a* in the pre-print area group G24.

According to this configuration, the pre-print area groups G21, G22, G23 and G24 are arranged in a zigzag pattern each other, so that the plurality of pre-print areas D22*a* are further densely arranged than the plurality of pre-print areas D22*a* are arranged in a grid pattern as a whole. Therefore, the printer 1 can suppress an increase in size of the thermosensitive label 30.

Figure 20C:
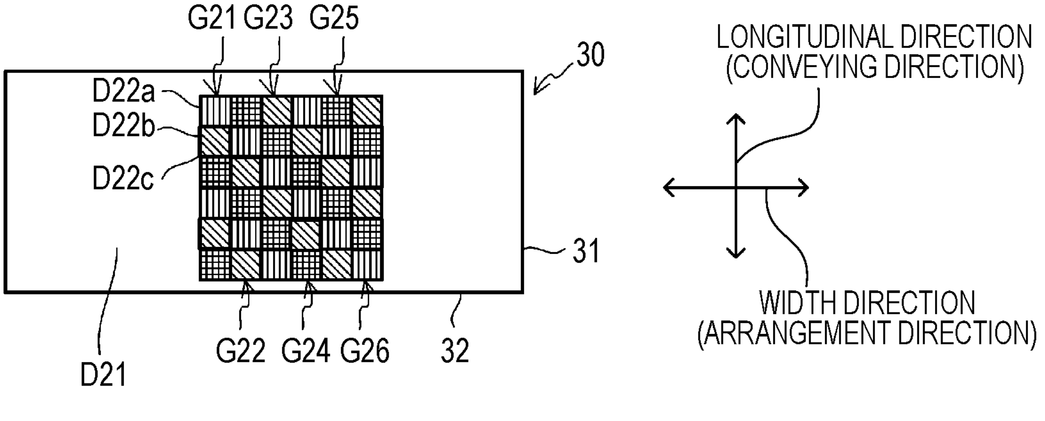

As shown in FIG. 20C, the thermosensitive label 30 has a background area D21 and a plurality of pre-print areas D22*a*, D22*b* and D22*c*. The pre-print colors of the plurality of pre-print areas D22*a*, D22*b* and D22*c* are different from each other. The plurality of pre-print areas D22*a*, D22*b* and D22*c* are arranged in a grid pattern as a whole. The plurality of pre-print areas D22*a*, D22*h* and D22*c* are arranged without gaps in the longitudinal direction according to a predetermined rule, and form pre-print area groups G21, G22, G23, G24, G25 and G26. Note that, the plurality of pre-print areas D22*a*, D22*b* and D22*c* may also be arranged at intervals in the longitudinal direction according to a predetermined rule.

The pre-print area groups G21, G22, G23, G24, G25 and G26 adjacent to each other are adjacent to each other without a gap. Note that, the pre-print area groups G21, G22, G23, G24, G25 and G26 adjacent to each other may also be arranged at positions apart from each other. Each of the pre-print area groups G21, G22, G23, G24, G25 and G26 is configured by repeating a pattern in which the pre-print area D22*a*, the pre-print area D22*b* and the pre-print area D22*c* are arranged in this order in the longitudinal direction, as the predetermined rule. Note that, the predetermined rule means that the pattern of the combination of the plurality of pre-print areas is repeated. For example, a pattern in which the pre-print area D22*a*, the pre-print area D22*b*, the pre-print area D22*c* and the pre-print area D22*b* are arranged in this order in the longitudinal direction may be repeated.

According to this configuration, for example, when thermal printing is performed so that the print area overlaps with all of the plurality of pre-print areas D22*a*, all of the plurality of pre-print areas D22*b* and all of the plurality of pre-print areas D22*c* are associated with exposed areas. In this case, the printer 1 can express a mixed color of the pre-print color of the pre-print area D22*b* and the pre-print color of the pre-print area D22*c* in the print result. In this way, the printer 1 can easily express a mixed color of a plurality of pre-print colors in the print result.

The modified embodiments of the thermosensitive label 30, the print data 50, and the print result 40 are described with reference to FIGS. 21 to 23B. The printer 1 uses the thermosensitive tape 10 provided with the thermosensitive label 30 shown in FIG. 21, instead of the thermosensitive label 30 shown in FIG. 17. The printer 1 performs thermal printing on the thermosensitive label 30 shown in FIG. 21, based on the print data 50 shown in FIG. 22A or FIG. 23A. Thereby, the printer 1 creates a print result 40 shown in FIG. 22B or FIG. 23B. In the below, differences from the second embodiment are mainly described.

The thermosensitive label 30 of the modified embodiment is described with reference to FIG. 21. The thermosensitive tape 10 has a background area D31, a plurality of pre-print areas D32*a*, D32*b*, D32*c*, D32*d* and D32*e*, a first information area D38, and a second information area D39. The plurality of pre-print areas D32*a*, D32*b* and D32*c* are arranged in the longitudinal direction. The plurality of pre-print area D32*d* and pre-print area D32*e* are arranged in the longitudinal direction, next to the plurality of pre-print areas D32*a*, D32*b* and D32*c* in the width direction. No pre-print area is arranged next to the pre-print area D32*c* in the width direction on the pre-print area D32*e*-side. The plurality of pre-print areas D32*a*, D32*b*, D32*c*, D32*d* and D32*e* are all arranged apart from each other in the longitudinal direction or the width direction. The pre-print colors of the plurality of pre-print areas D32*a*, D32*b*, D32*c* and D32*d* are different from each other.

The first information area D38 is arranged on a side opposite to the plurality of pre-print areas D32*d* and D32*e* with respect to the plurality of pre-print areas D32*a*, D32*b* and D32*c* in the width direction. Arbitrary information F31 is printed in advance in the first information area D38. The information F31 is, for example, "X PRODUCT".

A virtual line V2 passes between the plurality of pre-print areas D32*a*, D32*b* and D32*c* and the first information area D38, and extends in the longitudinal direction in parallel with the short side 31. Note that, when the first information area D38 is arranged with the plurality of pre-print areas D32*a*, D32*b*, D32*c*, D32*d* and D32*e* in the longitudinal direction, the virtual line V2 may extend in the width direction in parallel with the long side 32. The second information area D39 is located on an opposite side to the first information area D38 with respect to the virtual line V2. Specifically, the second information area D39 is arranged at a position on a side opposite to the virtual line V2 with respect to the pre-print area D32*a* in the width direction and opposite to the pre-print area D32*d* with respect to the pre-print area D32*e* the longitudinal direction. Note that, the second information area D39 may also be arranged at any one position of, for example, the pre-print areas D32*a*, D32*b*, D32*c*, D32*d* and D32*e*, or may also be arranged on an opposite side to the first information area D38 with respect to the pre-print areas D32*a*, D32*b*, D32*c*, D32*d* and D32*e* in the width direction.

Figure 22A:
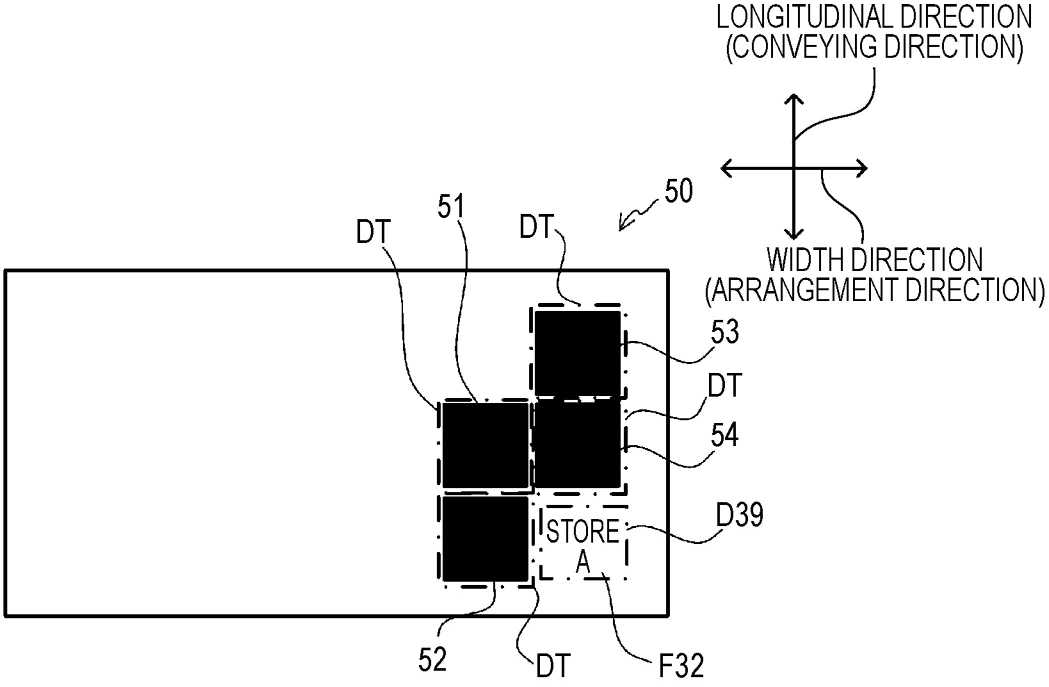
FIG. 22A is a conceptual diagram showing print data 50.
Figure 22B:
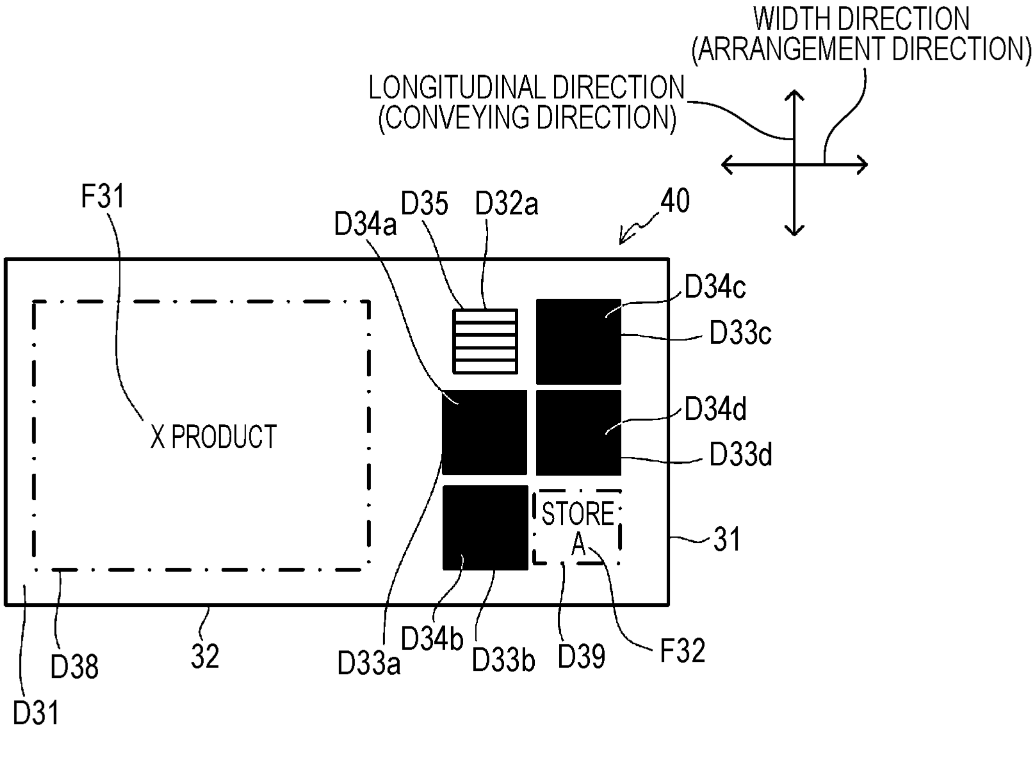
FIG. 22B is a schematic diagram showing a print result 40.
Figure 23A:
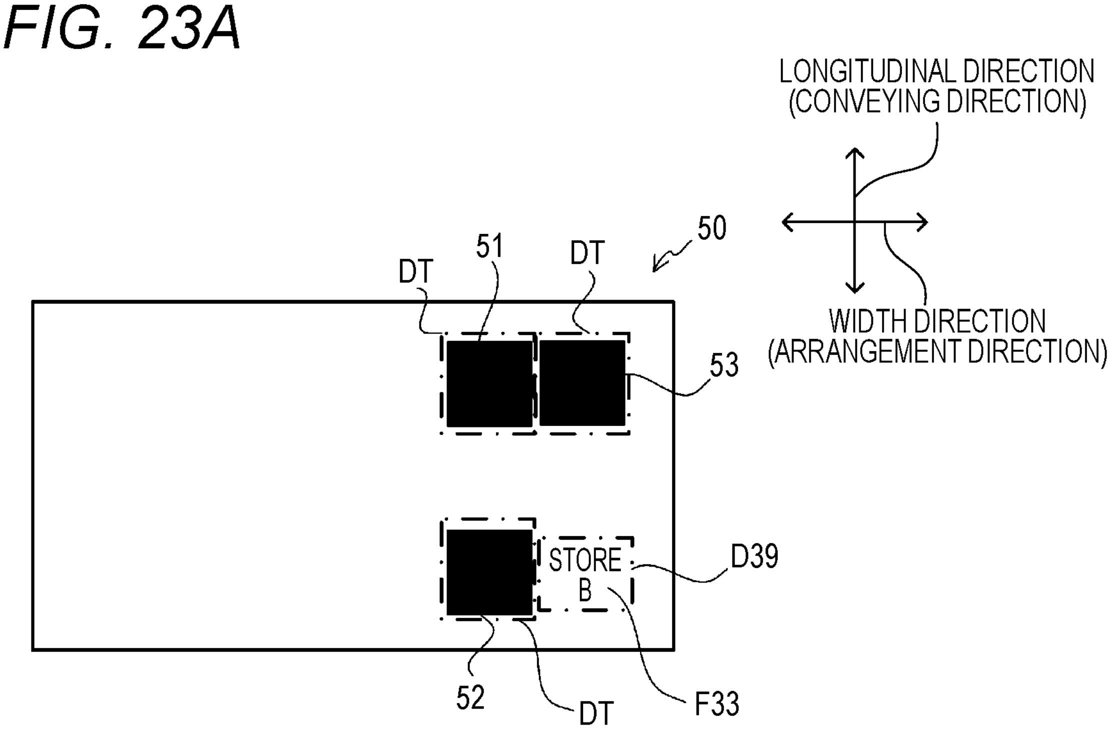
FIG. 23A is a conceptual diagram showing print data 50.
Figure 23B:
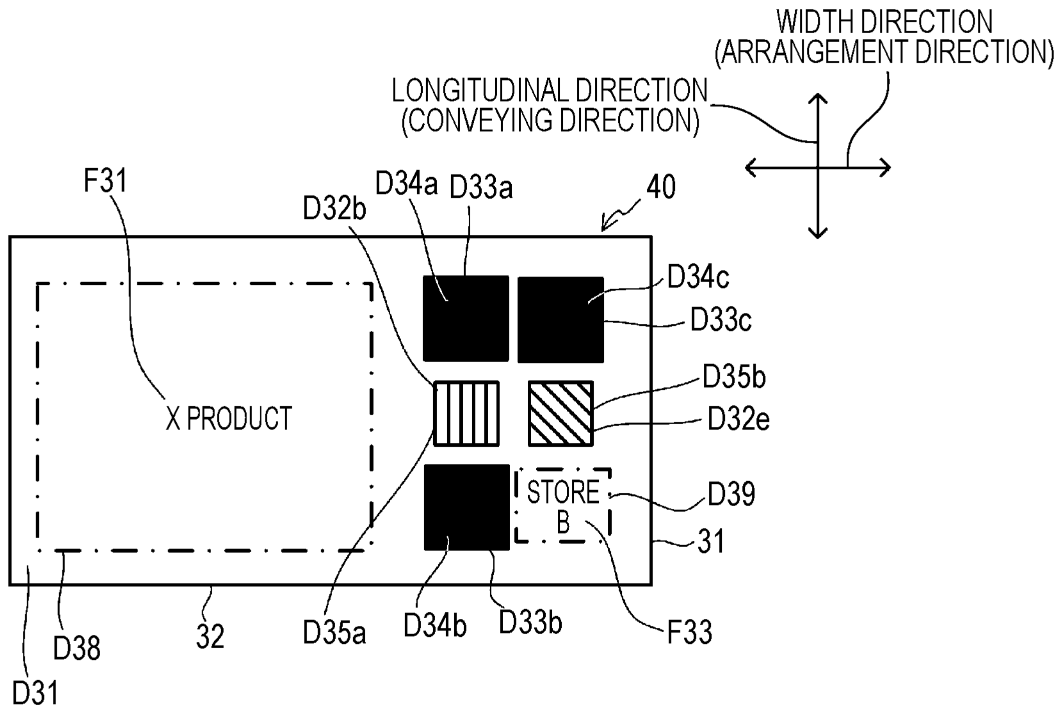
FIG. 23B is a schematic diagram showing a print result 40.

The print data 50 of the modified embodiments is described with reference to FIGS. 22A and 23A. FIG. 22A shows an example of an image of the print data 50, and print elements 51 to 54 corresponding to print areas D33*a*, D33*b*, D33*c* and D33*d* shown in FIG. 22B are shown in black paint. FIG. 23A shows an example of an image of the print data 50, and print elements 51 to 53 corresponding to print area D33*a*, D33*b* and D33*c* shown in FIG. 23B are shown in black paint.

The print data 50 shown in FIG. 22A includes print elements 51 to 54 and correspondence information F32. The print data 50 shown in FIG. 23A includes print elements 51 to 53 and correspondence information F33. In the print data 50 shown in FIG. 22A or 23A, the print element 51 is "■" (solid black square) as a kind of a text, and is arranged in a text area DT. Note that, the print elements 51 to 54 may also be an image. The correspondence information F11 shown in FIG. 22A is configured by the print elements, and is thermally printed in the first information area D39 shown in FIG. 2213 by the printing processing (S3) shown in FIG. 10. The correspondence information F33 shown in FIG. 23A is configured by the print elements, and is thermally printed in the second information area D39 shown in FIG. 23B by the printing processing (S3) shown in FIG. 10.

Figure 21:
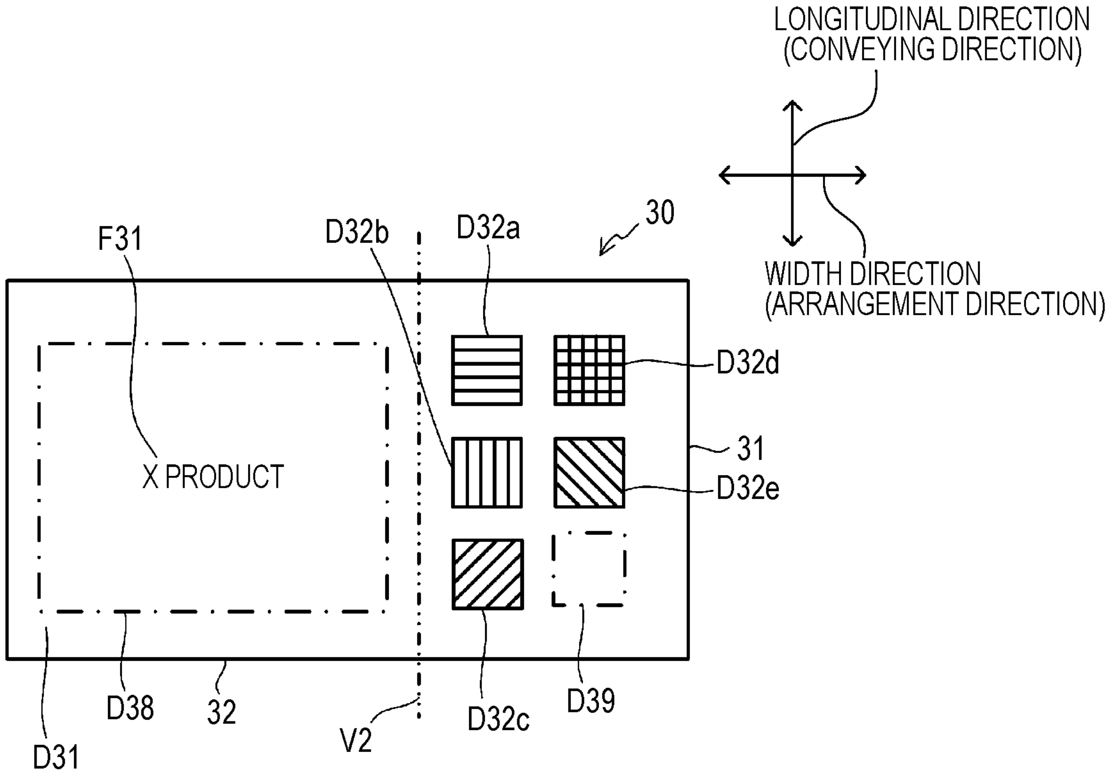
FIG. 21 is a schematic diagram showing a thermosensitive label 30.

The printer 1 creates a print result 40 shown in FIG. 22B by performing thermal printing on the thermosensitive label 30 shown in FIG. 21, based on the print data 50 shown in FIG. 22A. The printer 1 creates a print result 40 shown in FIG. 23B by performing thermal printing on the thermosensitive label 30 shown in FIG. 21, based on the print data 50 shown in FIG. 23A.

The print results 40 of the modified embodiments are described with reference to FIGS. 22B and 23B. In the print result 40 shown in FIG. 2211, the pre-print areas D32*b*, D32*c*, D32*d* and D32*e* are covered by the print areas D33*a*, D33*b*, D33*c* and D33*d*, respectively, Therefore, the pre-print areas D32*b*, D32*c*, D32*d* and D32*e* are associated with overlapping areas D34*a*, D34*b*, D34*c* and D34*d*, respectively, and the pre-print area D32*a* is associated with an exposed area D35. The print areas D33*a*, D33*b*, D33*c* and D33*d* are arranged apart from each other. Note that, a part or all of the print areas D33*a*, D33*b*, D33*c* and D33*d* may also be adjacent to each other without a gap. The correspondence information F32 is thermally printed in the second information area D39. The correspondence information F32 indicates that the pre-print color of the pre-print area D32*a* corresponds to "STORE A".

In the print result 40 shown in FIG. 23B, the pre-print areas D32*a*, D32*c* and D32*d* are covered by the print areas D33*a*, D33*b* and D33*c*, respectively. Therefore, the pre-print areas D32*a*, D32*c* and D32*d* are associated with overlapping areas D34*a*, D34*b* and D34*c*, respectively, and the pre-print areas D32*b* and D32*e* are associated with exposed areas D35. The correspondence information F33 is thermally printed in the second information area D39. The correspondence information F33 indicates that a combination of the respective pre-print colors of the pre-print areas D32*b* and D32*e* corresponds to "STORE B".

When the user sees the print result 40 shown in FIG. 22B, the user identifies the information by seeing the pre-print color of the pre-print area D32*a*, the information F31 and the correspondence information F32. When the user sees the print result 40 shown in FIG. 23B, the user identifies the information by seeing the combination of the respective pre-print colors of the pre-print areas D32*b* and D32*e*, the information F31 and the correspondence information F33.

According to this configuration, since the thermosensitive label 30 has the second information area D39, the printer 1 can also record information in the second information area D39. Note that, in the printing processing, other arbitrary information may be thermally printed in the second information area D39, instead of or in addition to the correspondence information. Information may also be printed in advance in the second information area D39.

The print areas D33*a*, D33*b*, D33*c* and D33*d* are arranged apart from each other. According to this configuration, the user can easily identify the positions of the pre-print areas D32*a*, D32*b*, D32*c*, D32*d* and D32*e*, as compared to a case where a part or all of the print areas D33*a*, D33*b*, D33*c* and D33*d* are connected to each other.

Figure 24A:
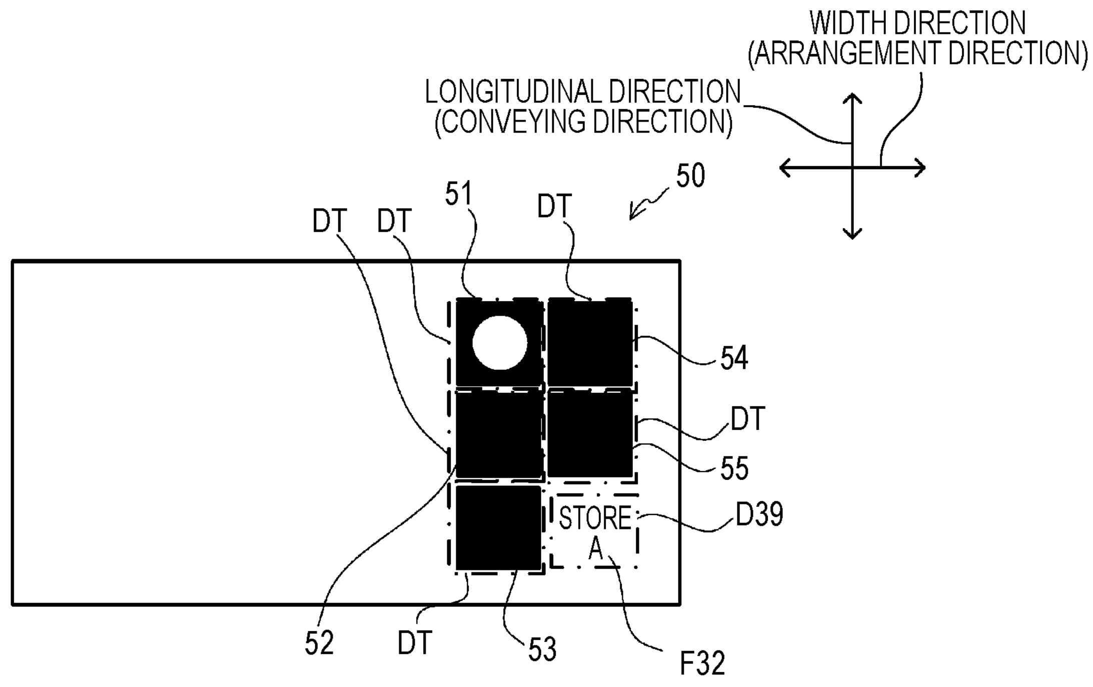
FIG. 24A is a conceptual diagram showing print data 50.

A modified embodiment of the print data 50 and the print result 40 is described with reference to FIGS. 24A and 24B.

In the below, the differences from the print data 50 shown in FIG. 22A are described. The print data 50 shown in FIG. 24A includes a text area DT filled with a print color and an outlined print element 51 arranged in the text area DT. The print element 51 is a white text "○" (white circle).

Figure 24B:
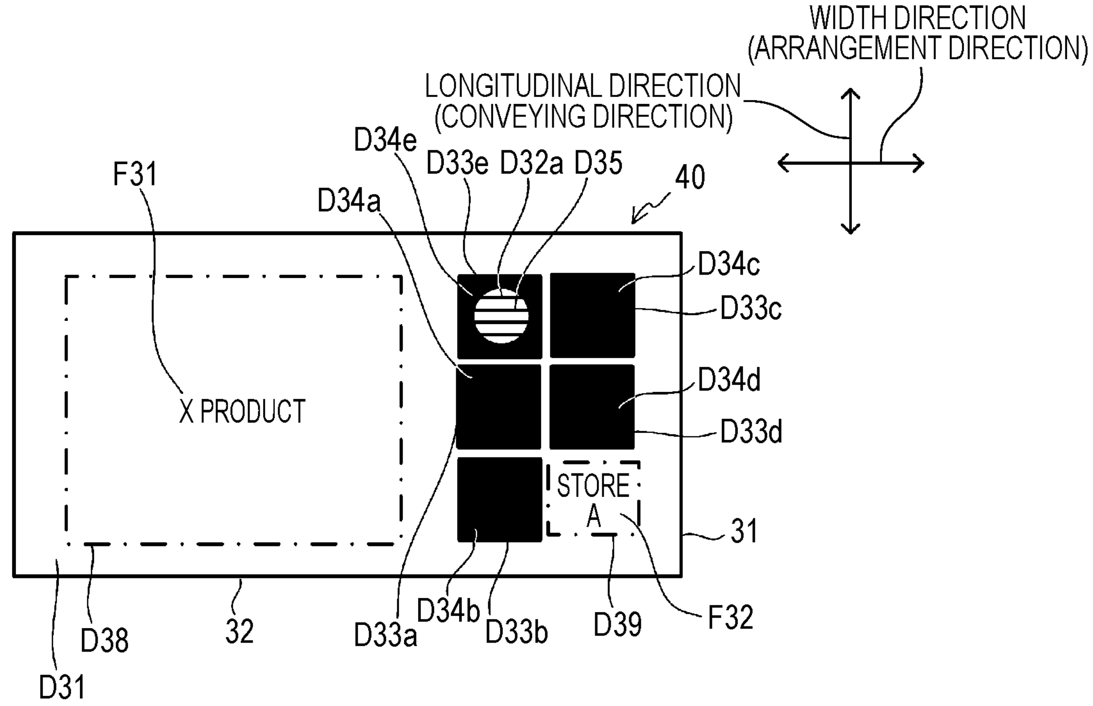
FIG. 24B is a schematic diagram showing a print result 40.

In this case, when thermal printing is performed on the thermosensitive label 30 shown in FIG. 21, based on the print data 50, by the printing processing, a print result 40 shown in FIG. 24B is created. In the print result 40, the pre-print areas D32*b*, D32*c*, D32*d* and D32*e* are covered by the print areas D33*a*, D33*b*, D33*c* and D33*d*, respectively. A part of the pre-print area D32*a* is covered by the print area D33*e*. Therefore, the pre-print areas D32*b*, D32*c*, D32*d* and D32*e* are associated with overlapping areas D34*a*, D34*b*, D34*c* and D34*d*, respectively, a part of the pre-print area D32*a* is associated with an overlapping area D34*e*, and a part of the pre-print area D32*a* is associated with an exposed area D35. A shape of the exposed area D35 is the shape of the print element 51, and is "○" (while circle), as an example. In this case, the correspondence information F32 indicates that the shape "○" (while circle) of the exposed area D35 having the pre-print color of the pre-print area D32*a* corresponds to "STORE A".

According to this configuration, the printer 1 can show the shape of the text (for example, "○" (while circle)) in the print result 40 by the pre-print color. Therefore, the user can easily identify the information by the pre-print area.

The thermosensitive layer 13 may be capable of developing two colors different from each other depending on a difference in heating temperature by thermal printing, or may be capable of developing three or more colors different from each other. The thermosensitive tape 10 may include two thermosensitive layers that develop colors different from each other depending on the difference in heating temperature by thermal printing. In this case, the CPU 71 may perform thermal printing on a plurality of print areas with different print colors in the printing processing, respectively. Specifically, in the print result 40 shown in FIG. 24B, the CPU 71 may thermally print the print area D33*e* with a first print color, and may thermally print the print areas D33*a*, D33*b*, D33*c* and D33*d* with a second print color. In this case, since there are a plurality of specific colors (print colors), the printer 1 can increase the number of patterns for identifying information in the print result 40.

The area of the pre-print area D2 may be smaller than 25 $mm^2$. The area of the pre-print area D2 is preferably equal to or larger than 3 $mm^2$, When the area of the pre-print area D2 is equal to or larger than 3 $mm^2$, the printer 1 can increase the area of the pre-print area D2 to the extent that the user can easily visually recognize the pre-print color. Therefore, the user can easily visually recognize the information by the exposed area D5 on the print result 40. When there are a plurality of pre-print areas as in each modified embodiment, a part or all of each area of the plurality of pre-print areas may be equal to or larger than 25 $mm^2$, may be equal to or larger than 3 $mm^2$, or may be smaller than 3 $mm^2$.

Note that, It is preferable that the printer 1 adopts, as the pre-print color, a color that can be easily distinguished from the background color or the print color, for example. By adopting a color that can be easily distinguished as the pre-print color, the printer 1 can appropriately convey information in a print result to, for example, a color-blind person. The easily distinguishable color is, for example, a high-chroma accent color. Specifically, the high-chroma accent color is defined by color values of (C, M, Y, K)=(0, 75, 90, 0), (0, 0, 100, 0), (75, 0, 65, 0), (100, 45, 0, 0), (55, 0, 0, 0), (0, 55, 35, 0), (0, 45, 100, 0), (30, 95, 0, 0) and (55, 90, 100, 0) in the CMYK color space (4-color process color printing, Japanese Color compliance) or color values of (R, G, B)=(255, 75, 0), (255, 241, 0), (3, 175, 122), (0, 90, 255), (77, 196, 255), (255,128,130), (246, 170, 0) (153, 0, 153) and (128, 64, 0) in the RCSB color space (sRGB-compliant display). The pre-print color is preferably one of the high-chroma accent colors. When there are a plurality of pre-print colors, at least one of the plurality of pre-print colors is preferably a high-chroma accent color.

The thermosensitive tape 10 of the first embodiment or the thermosensitive label 30 of the second embodiment corresponds to the "thermosensitive medium" of the present disclosure. The platen roller 26 corresponds to the "conveying unit" of the present disclosure. The CPU 71 corresponds to the "controller" of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer system comprising:

a thermal head configured to perform thermal printing on a thermosensitive medium having a background area with a background color being an unprinted color and a pre-print area, which is an area colored in advance, with a pre-print color different from the background color; and a controller configured to perform printing processing of causing the thermal head to execute the thermal printing in which a print area, which includes at least a part of the pre-print area, of the thermosensitive medium is printed with a print color different from both the background color and the pre-print color, and an overlapping area of the pre-print area, which overlaps with the print area, is printed with a specific color different from the pre-print color.

2. The printer according to claim 1, wherein the thermosensitive medium has a first information area which is an area provided at a position different from the pre-print area and in which information is recorded.

3. The printer according to claim 2, wherein the controller is configured to cause the thermal head to execute the thermal printing of recording correspondence information, which indicates information corresponding to the pre-print color or a shape of the overlapping area, in the first information area.

4. The printer according to claim 2, wherein correspondence information, which indicates information corresponding to the pre-print color or a shape of the overlapping area, is printed in advance in the first information area.

5. The printer according to claim 2, wherein the thermosensitive medium has a second information area in which information is recorded, and the second information area is located at an opposite side to the first information area with respect to a virtual line which passes between the pre-print area and the first information area and extends parallel to any one side of the thermosensitive medium.

6. The printer according to claim 1, wherein the thermosensitive medium is configured by laminating a base material, a thermosensitive layer, which is color-developed into the print color as the thermal printing is performed, and a pre-print layer defining the pre-print area in this order, and light transmittance of the pre-print layer is higher than light transmittance of the print area color-developed into the print color of the thermosensitive layer.

7. The printer according to claim 1, wherein the thermosensitive medium is configured by laminating a base material, a pre-print layer defining the pre-print area, and a thermosensitive layer, which is color-developed into the print color as the thermal printing is performed, in this order.

8. The printer according to claim 1:

wherein the thermosensitive medium has a plurality of the pre-print areas, the plurality of pre-print areas include:

a first pre-print area with a first pre-print color that is one as the pre-print color; and a second pre-print area with a second pre-print color which is the pre-print color different from the first pre-print color, and the first pre-print area and the second pre-print area are arranged apart from each other without interposing the pre-print area between the first pre-print area and the second pre-print area.

9. The printer according to claim 1, wherein the thermosensitive medium has a plurality of the pre-print areas, the plurality of pre-print areas include:

a first pre-print area with a first pre-print color that is one as fine pre-print color; and a second pre-print area with a second pre-print color which is the pre-print color, which is the same as or different from the first pre-print color, and the first pre-print area and the second pre-print area are arranged adjacent to each other without a gap.

10. The printer according to claim 1, wherein an area of the pre-print area is equal to or larger than 3 $mm^2$.

11. The printer according to claim 1, wherein an area of the pre-print area is equal to or larger than 25 $mm^2$.

12. The printer according to claim 1, wherein the thermosensitive medium has a rectangular shape having a short side and a long side orthogonal to the short side and longer than the short side, the thermosensitive medium has a plurality of the pre-print areas, the plurality of pre-print areas are arranged along the short side, and in a case where a length of the short side is denoted as X mm and a number of the plurality of pre-print areas is denoted as Y, $X/Y \geq 1.4$ is satisfied.

13. The printer according to claim 1, wherein the thermosensitive medium has a rectangular shape having a short side and a long side orthogonal to the short side and longer than the short side, the thermosensitive medium has a plurality of the pre-print areas, the plurality of pre-print areas are arranged along the long side, and in a case where a length of the long side is denoted as X mm and a number of the plurality of pre-print areas is denoted as Y, $X/Y \geq 1.4$ is satisfied.

14. The printer system according to claim 1, wherein the print color satisfies both conditions of brightness≤4 and chroma≤3 in a Munsell color system, and the pre-print color is a color in the Munsell color system, which does not satisfy both conditions of brightness≤2 and chroma<1 and does not satisfy both conditions of brightness≥8 and chroma<1.

15. The printer according to claim 1, wherein the thermosensitive medium has a plurality of the pre-print areas, the plurality of pre-print areas include:

a first pre-print area with a first pre-print color that is one as the pre-print color; and a second pre-print area with a second pre-print color that is the pre-print color different from the first pre-print color, and a value of a color difference $\Delta E^*ab$ between the first pre-print color and the second pre-print color in a $L^*a^*b^*$ color system is equal to or larger than 1.5.

16. The printer according to claim 1, wherein the pre-print area is located at a position apart from at least a portion of a peripheral edge of the thermosensitive medium.

17. The printer according to claim 1, comprising a conveying unit configured to convey the thermosensitive medium in a conveying direction, wherein the thermosensitive medium has a plurality of the pre-print areas, and the plurality of pre-print areas include a first pre-print area and a second pre-print area arranged each other in the conveying direction and having a same pre-print color.

18. The printer according to claim 1, wherein the thermosensitive medium has a plurality of the pre-print areas, the plurality of pre-print areas are arranged in a grid shape, and include:

a first pre-print area with a first pre-print color that is one as the pre-print color; and a second pre-print area with a second pre-print color that is the pre-print color of a same type of color as the first pre-print color, and the first pre-print area and the second pre-print area are arranged diagonally each other.

19. The printer according to claim 1, wherein an outer shape of the pre-print area is rectangular, and the controller is configured to cause the thermal head to execute the thermal printing, based on text data indicating a text arranged in a rectangular text area, in the printing processing.

20. The printer according to claim 1, wherein the thermosensitive medium has a plurality of the pre-print areas, outer shapes of the plurality of pre-print areas are each a circular shape or an elliptical shape, the thermosensitive medium has:

a first pre-print area group having a plurality of the pre-print areas arranged in a first direction; and a second pre-print area group located in a second direction orthogonal to the first direction with respect to the first pre-print area group and having a plurality of the pre-print areas arranged in the first direction, and the first pre-print area group and the second pre-print area group are arranged in a zigzag pattern each other.

21. The printer according to claim 1, wherein the thermosensitive medium has a plurality of the pre-print areas, the plurality of pre-print areas include:

a first pre-print area with a first pre-print color that is one as the pre-print color; and a second pre-print area with a second pre-print color that is the pre-print color different from the first pre-print color, and the thermosensitive medium has:

a first pre-print area group in which the first pre-print area and the second pre-print area are arranged in a first direction according to a predetermined rule; and a second pre-print area group, which is located in a second direction orthogonal to the first direction with respect to the first pre-print area group and in which the first pre-print area and the second pre-print area are arranged in the first direction according to the predetermined rule.

22. The printer according to claim 1, wherein the thermosensitive medium has a plurality of the pre-print areas, the plurality of pre-print areas include a first pre-print area and a second pre-print area, and a barycenter of the first pre-print area and a barycenter of the second pre-print area coincide with each other.

23. The printer according to claim 1, comprising a conveying unit configured to convey the thermosensitive medium in a conveying direction, wherein the controller is configured to cause the thermal head to execute the thermal printing while causing the conveying unit to convey the thermosensitive medium, in the printing processing, the thermosensitive medium has a plurality of the pre-print areas, the plurality of pre-print areas include:

a first pre-print area that is one as the pre-print area; and a second pre-print area that is the pre-print area different from the first pre-print area, and the first pre-print area and the second pre-print area are arranged at positions offset from each other in both the conveying direction and an orthogonal direction orthogonal to the conveying direction.

24. The printer according to claim 1, comprising a conveying unit configured to convey the thermosensitive medium in a conveying direction, wherein the controller is configured to cause the thermal head to execute the thermal printing while causing the conveying unit to convey the thermosensitive medium, in the printing processing, wherein the thermosensitive medium has:

a first pre-print area that is one as the pre-print area; and a second pre-print area that is the pre-print area different from the first pre-print area, and wherein the first pre-print area and the second pre-print area are arranged each other in the conveying direction or in an orthogonal direction orthogonal to the conveying direction.

25. The printer according to claim 24, wherein the thermal head comprises a plurality of heat generators arranged in the orthogonal direction, and the first pre-print area and the second pre-print area are arranged each other in the orthogonal direction.

26. The primer according to claim 24, wherein the first pre-print area and the second pre-print area are arranged each other in the conveying direction.

27. The printer according to claim 1, wherein the thermosensitive medium has a plurality of the pre-print areas, the plurality of pre-print areas include a first pre-print area and a second pre-print area having a same pre-print color, and the first pre-print area and the second pre-print area are arranged at point-symmetrical positions with respect to a barycenter of the thermosensitive medium, or are arranged at line-symmetrical positions with respect to a virtual line passing through a barycenter of the thermosensitive medium.

28. The printer according to claim 1, wherein in the printing processing, the controller is configured to cause the thermal head to execute the thermal printing in which a first print area, which is one as the print area, is printed with a first print color, which is one as the print color, and a first overlapping area, which is the overlapping area of the pre-print area overlapping with the first print area, is printed with a first specific color that is one as the specific color, and is also configured to cause the thermal head to execute the thermal printing in which a second print area, which is the print area different from the first print area, is printed with a second print color that is the print color different from the first print color, and a second overlapping area, which is the overlapping area of the pre-print area overlapping with the second print area, is printed with a second specific color that is the specific color different from the first specific color.

29. The printer according to claim 19, wherein the controller is configured to:

perform generation processing of generating the text data; and cause the thermal head to execute the thermal printing, based on the text data generated by the generation processing, in the printing processing.

30. The printer according to claim 29, wherein the controller is configured to generate the text data indicating the text area filled with the print color, and the text of white letters arranged in the text area, in the generation processing.

31. The printer according to claim 29, wherein the controller is configured to generate the text data indicating the text of a bold type in the generation processing, a standard type being a font in which a thickness of the text is a standard, and the bold type being a font in which the thickness of the text is thicker than the standard type.

32. The printer according to claim 29, wherein the controller is configured to generate the text data indicating the text having a font size in which a length of one side of the text area is equal to or larger than 1.41 mm, in the generation processing.

33. The printer according to claim 1, wherein the controller is configured to:

perform generation processing of generating image data indicating an image; and cause the thermal head to execute the thermal printing, based on the image data generated by the generation processing, in the printing processing.

34. The printer according to claim 1, wherein the print area is an area larger than the pre-print area and surrounding an entire of the pre-print area.

35. The printer according to claim 8, wherein the controller is configured to cause the thermal head to execute the thermal printing in which a first print area, which is the print area including at least a part of the first pre-print area of the thermosensitive medium, is printed with the print color, and is also configured to cause the thermal head to execute the thermal printing in which a second print area, which is the print area including at least a part of the second pre-print area of the thermosensitive medium and is arranged apart from the first print area without interposing the print area between the first print area and the second print area, is printed with the print color, in the printing processing.

36. The printer according to claim 1, wherein a difference between an area of the pre-print area and an area of the overlapping area is larger than an area of the print area.

37. The printer according to claim 1, wherein the thermosensitive medium has a plurality of the pre-print areas, the plurality of pre-print areas include: a first pre-print area with a first pre-print color that is one as the pre-print color; and a second pre-print area with a second pre-print color that is the pre-print color different from the first pre-print color, and the controller is configured to cause the thermal head to execute the thermal printing in which the print area, which includes one of at least a part of the first pre-print area and at least a part of the second pre-print area, of the thermosensitive medium, is printed with the print color.

38. A control method of a printer configured to perform thermal printing on a thermosensitive medium having a background area with a background color being an unprinted color and a pre-print area, which is an area colored in advance, with a pre-print color different from the background color, the control method comprising: printing processing of performing the thermal printing in which a print area, which includes at least a part of the pre-print area, of the thermosensitive medium is printed with a print color different from both the background color and the pre-print color, and an overlapping area of the pre-print area, which overlaps with the print area, is printed with a specific color different from the pre-print color.

* * * * *